US009413066B2

(12) United States Patent
Zhu et al.

(10) Patent No.: US 9,413,066 B2
(45) Date of Patent: Aug. 9, 2016

(54) METHOD AND APPARATUS FOR BEAM FORMING AND ANTENNA TUNING IN A COMMUNICATION DEVICE

(75) Inventors: Lizhong Zhu, Waterloo (CA); Jun Xu, Scarborough (CA); Fei He, Waterloo (CA)

(73) Assignee: BlackBerry Limited, Waterloo ON (*) Notice: Subject to any disclaimer, the term of this patent is extended or adjusted under 35 U.S.C. 154(b) by 653 days.

(21) Appl. No.: 13/552,806

(22) Filed: Jul. 19, 2012

(65) Prior Publication Data

US 2014/0022125 A1   Jan. 23, 2014

(51) Int. Cl.
*H01Q 3/00* (2006.01)
*H01Q 3/26* (2006.01)
*H04B 7/06* (2006.01)

(52) U.S. Cl.
CPC .............. *H01Q 3/2611* (2013.01); *H01Q 3/26* (2013.01); *H04B 7/0617* (2013.01)

(58) Field of Classification Search
CPC ....... H01Q 3/26; H01Q 3/2611; H04B 7/0617
USPC ........................................................ 342/371
See application file for complete search history.

(56) References Cited

U.S. PATENT DOCUMENTS

| | | | |
|---|---|---|---|
| 2,745,067 A | 5/1956 | True | |
| 3,117,279 A | 1/1964 | Ludvigson | |
| 3,160,832 A | 12/1964 | Beitman | |
| 3,390,337 A | 6/1968 | Beitman | |
| 3,443,231 A | 5/1969 | Roza | |
| 3,509,500 A | 4/1970 | McNair | |
| 3,571,716 A | 3/1971 | Hill | |
| 3,590,385 A | 6/1971 | Sabo | |
| 3,601,717 A | 8/1971 | Kuecken | |
| 3,794,941 A | 2/1974 | Templin | |
| 3,919,644 A | 11/1975 | Smolka | |
| 3,990,024 A | 11/1976 | Hou | |
| 3,995,237 A | 11/1976 | Brunner | |
| 4,186,359 A | 1/1980 | Kaegebein | |

(Continued)

FOREIGN PATENT DOCUMENTS

| | | |
|---|---|---|
| CN | 101640949 A | 2/2010 |
| DE | 19614655 | 10/1997 |

(Continued)

OTHER PUBLICATIONS

Payandehjoo, Kasra et al., "Investigation of Parasitic Elements for Coupling Reduction in Multi Antenna Hand-Set Devices", Published online Jan. 22, 2013 in Wiley Online Library (wileyonlinelibrary.com).

(Continued)

*Primary Examiner* — Frank J McGue
(74) *Attorney, Agent, or Firm* — Guntin & Gust, PLC; Andrew Gust

(57) ABSTRACT

A system that incorporates teachings of the subject disclosure may include, for example, determining antenna coupling among a plurality of antennas of the communication device and adjusting beam forming for the plurality of antennas utilizing phase shifters coupled with radiating elements of the plurality of antennas, where the adjusting of the beam forming is based on forming a desired antenna pattern that increases radiated throughput and reduces the antenna coupling among the plurality of antennas. Other embodiments are disclosed.

12 Claims, 18 Drawing Sheets

(56) References Cited

U.S. PATENT DOCUMENTS

| | | |
|---|---|---|
| 4,201,960 A | 5/1980 | Skutta |
| 4,227,256 A | 10/1980 | O'Keefe |
| 4,383,441 A | 5/1983 | Willis |
| 4,476,578 A | 10/1984 | Gaudin |
| 4,493,112 A | 1/1985 | Bruene |
| 4,509,019 A | 4/1985 | Banu et al. |
| 4,777,490 A | 10/1988 | Sharma |
| 4,799,066 A | 1/1989 | Deacon |
| 4,965,607 A | 10/1990 | Wilkins |
| 4,980,656 A | 12/1990 | Duffalo |
| 5,032,805 A | 7/1991 | Elmer |
| 5,142,255 A | 8/1992 | Chang |
| 5,177,670 A | 1/1993 | Shinohara |
| 5,195,045 A | 3/1993 | Keane |
| 5,200,826 A | 4/1993 | Seong |
| 5,212,463 A | 5/1993 | Babbitt |
| 5,230,091 A | 7/1993 | Vaisanen et al. |
| 5,243,358 A | 9/1993 | Sanford |
| 5,258,728 A | 11/1993 | Taniyoshi |
| 5,276,912 A | 1/1994 | Siwiak |
| 5,301,358 A | 4/1994 | Gaskill |
| 5,307,033 A | 4/1994 | Koscica |
| 5,310,358 A | 5/1994 | Johnson |
| 5,312,790 A | 5/1994 | Sengupta |
| 5,334,958 A | 8/1994 | Babbitt |
| 5,361,403 A | 11/1994 | Dent |
| 5,371,473 A | 12/1994 | Trinh |
| 5,409,889 A | 4/1995 | Das |
| 5,427,988 A | 6/1995 | Sengupta |
| 5,430,417 A | 7/1995 | Martin |
| 5,446,447 A | 8/1995 | Carney |
| 5,448,252 A | 9/1995 | Ali |
| 5,451,567 A | 9/1995 | Das |
| 5,451,914 A | 9/1995 | Stengel |
| 5,457,394 A | 10/1995 | McEwan |
| 5,472,935 A | 12/1995 | Yandrofski |
| 5,479,139 A | 12/1995 | Koscica |
| 5,486,491 A | 1/1996 | Sengupta |
| 5,496,795 A | 3/1996 | Das |
| 5,502,372 A | 3/1996 | Quan |
| 5,524,281 A | 6/1996 | Bradley |
| 5,548,837 A | 8/1996 | Hess et al. |
| 5,561,407 A | 10/1996 | Koscica |
| 5,564,086 A | 10/1996 | Cygan |
| 5,589,844 A | 12/1996 | Belcher et al. |
| 5,593,495 A | 1/1997 | Masuda |
| 5,635,433 A | 6/1997 | Sengupta |
| 5,635,434 A | 6/1997 | Sengupta |
| 5,640,042 A | 6/1997 | Koscica |
| 5,679,624 A | 10/1997 | Das |
| 5,689,219 A | 11/1997 | Piirainen |
| 5,693,429 A | 12/1997 | Sengupta |
| 5,694,134 A | 12/1997 | Barnes |
| 5,699,071 A | 12/1997 | Urakami |
| 5,721,194 A | 2/1998 | Yandrofski |
| 5,766,697 A | 6/1998 | Sengupta |
| 5,777,581 A | 7/1998 | Lilly |
| 5,778,308 A | 7/1998 | Sroka |
| 5,786,727 A | 7/1998 | Sigmon |
| 5,812,572 A | 9/1998 | King |
| 5,812,943 A | 9/1998 | Suzuki |
| 5,830,591 A | 11/1998 | Sengupta |
| 5,846,893 A | 12/1998 | Sengupta |
| 5,874,926 A | 2/1999 | Tsuru |
| 5,880,635 A | 3/1999 | Satoh |
| 5,886,867 A | 3/1999 | Chivukula |
| 5,892,482 A | 4/1999 | Coleman et al. |
| 5,929,717 A | 7/1999 | Richardson |
| 5,940,030 A | 8/1999 | Hampel et al. |
| 5,963,871 A | 10/1999 | Zhinong |
| 5,969,582 A | 10/1999 | Boesch |
| 5,982,099 A | 11/1999 | Barnes et al. |
| 5,990,766 A | 11/1999 | Zhang |
| 6,009,124 A | 12/1999 | Smith |
| 6,020,787 A | 2/2000 | Kim |
| 6,020,795 A | 2/2000 | Kim |
| 6,029,075 A | 2/2000 | Das |
| 6,045,932 A | 4/2000 | Jia |
| 6,061,025 A | 5/2000 | Jackson |
| 6,064,865 A * | 5/2000 | Kuo et al. ............... 455/135 |
| 6,074,971 A | 6/2000 | Chiu |
| 6,096,127 A | 8/2000 | Dimos |
| 6,100,733 A | 8/2000 | Dortu |
| 6,101,102 A | 8/2000 | Brand |
| 6,115,585 A | 9/2000 | Matero |
| 6,125,266 A | 9/2000 | Matero et al. |
| 6,133,883 A | 10/2000 | Munson |
| 6,172,385 B1 | 1/2001 | Duncombe |
| 6,215,644 B1 | 4/2001 | Dhuler |
| 6,242,989 B1 | 6/2001 | Barber |
| 6,266,528 B1 * | 7/2001 | Farzaneh ............. H04B 17/318 |
| | | 342/173 |
| 6,281,748 B1 | 8/2001 | Klomsdorf et al. |
| 6,281,847 B1 | 8/2001 | Lee |
| 6,343,208 B1 | 1/2002 | Ying |
| 6,377,142 B1 | 4/2002 | Chiu |
| 6,377,217 B1 | 4/2002 | Zhu |
| 6,377,440 B1 | 4/2002 | Zhu |
| 6,384,785 B1 | 5/2002 | Kamogawa |
| 6,404,614 B1 | 6/2002 | Zhu |
| 6,408,190 B1 | 6/2002 | Ying |
| 6,414,562 B1 | 7/2002 | Bouisse |
| 6,415,562 B1 | 7/2002 | Donaghue |
| 6,452,776 B1 | 9/2002 | Chakravorty |
| 6,461,930 B2 | 10/2002 | Akram |
| 6,466,774 B1 | 10/2002 | Okabe |
| 6,492,883 B2 | 12/2002 | Liang |
| 6,514,895 B1 | 2/2003 | Chiu |
| 6,525,630 B1 | 2/2003 | Zhu |
| 6,531,936 B1 | 3/2003 | Chiu |
| 6,535,076 B2 | 3/2003 | Partridge |
| 6,535,722 B1 | 3/2003 | Rosen |
| 6,538,603 B1 | 3/2003 | Chen |
| 6,556,102 B1 | 4/2003 | Sengupta |
| 6,556,814 B1 | 4/2003 | Klomsdorf |
| 6,570,462 B2 | 5/2003 | Edmonson |
| 6,590,468 B2 | 7/2003 | du Toit |
| 6,590,541 B1 | 7/2003 | Schultze |
| 6,597,265 B2 | 7/2003 | Liang |
| 6,608,603 B2 | 8/2003 | Alexopoulos |
| 6,624,786 B2 | 9/2003 | Boyle |
| 6,640,085 B1 | 10/2003 | Chatzipetros |
| 6,657,595 B1 | 12/2003 | Phillips |
| 6,661,638 B2 | 12/2003 | Jackson |
| 6,670,256 B2 | 12/2003 | Yang |
| 6,710,651 B2 | 3/2004 | Forrester |
| 6,724,611 B1 | 4/2004 | Mosley |
| 6,724,890 B1 | 4/2004 | Bareis |
| 6,737,179 B2 | 5/2004 | Sengupta |
| 6,747,522 B2 | 6/2004 | Pietruszynski et al. |
| 6,759,918 B2 | 7/2004 | Du Toit |
| 6,765,540 B2 | 7/2004 | Toncich |
| 6,768,472 B2 | 7/2004 | Alexopoulos |
| 6,774,077 B2 | 8/2004 | Sengupta |
| 6,795,712 B1 | 9/2004 | Vakilian |
| 6,825,818 B2 | 11/2004 | Toncich |
| 6,839,028 B2 | 1/2005 | Lee |
| 6,845,126 B2 | 1/2005 | Dent |
| 6,859,104 B2 | 2/2005 | Toncich |
| 6,862,432 B1 | 3/2005 | Kim |
| 6,864,757 B2 | 3/2005 | Du Toit |
| 6,868,260 B2 | 3/2005 | Jagielski |
| 6,882,245 B2 | 4/2005 | Utsunomiya |
| 6,888,714 B2 | 5/2005 | Shaw |
| 6,905,989 B2 | 6/2005 | Ellis |
| 6,906,653 B2 | 6/2005 | Uno |
| 6,907,234 B2 | 6/2005 | Karr |
| 6,920,315 B1 | 7/2005 | Wilcox et al. |
| 6,943,078 B1 | 9/2005 | Zheng |
| 6,946,847 B2 | 9/2005 | Nishimori |
| 6,949,442 B2 | 9/2005 | Barth |
| 6,961,368 B2 | 11/2005 | Dent |
| 6,964,296 B2 | 11/2005 | Memory |
| 6,965,837 B2 | 11/2005 | Vintola |

(56) References Cited

U.S. PATENT DOCUMENTS

| | | | |
|---|---|---|---|
| 6,987,493 B2 * | 1/2006 | Chen | 343/893 |
| 6,993,297 B2 | 1/2006 | Smith | |
| 7,009,455 B2 | 3/2006 | Toncich | |
| 7,071,776 B2 | 7/2006 | Forrester | |
| 7,106,715 B1 | 9/2006 | Kelton | |
| 7,107,033 B2 | 9/2006 | du Toit | |
| 7,113,614 B2 | 9/2006 | Rhoads | |
| 7,151,411 B2 | 12/2006 | Martin | |
| 7,176,634 B2 | 2/2007 | Kitamura | |
| 7,176,845 B2 | 2/2007 | Fabrega-Sanchez | |
| 7,180,467 B2 | 2/2007 | Fabrega-Sanchez | |
| 7,221,327 B2 | 5/2007 | Toncich | |
| 7,298,329 B2 | 11/2007 | Diament | |
| 7,299,018 B2 | 11/2007 | Van Rumpt | |
| 7,312,118 B2 | 12/2007 | Kiyotoshi | |
| 7,332,980 B2 | 2/2008 | Zhu | |
| 7,332,981 B2 | 2/2008 | Matsuno | |
| 7,339,527 B2 | 3/2008 | Sager | |
| 7,426,373 B2 | 9/2008 | Clingman | |
| 7,427,949 B2 | 9/2008 | Channabasappa | |
| 7,453,405 B2 | 11/2008 | Nishikido et al. | |
| 7,468,638 B1 | 12/2008 | Tsai | |
| 7,469,129 B2 | 12/2008 | Blaker et al. | |
| 7,528,674 B2 | 5/2009 | Kato et al. | |
| 7,535,080 B2 | 5/2009 | Zeng et al. | |
| 7,535,312 B2 | 5/2009 | McKinzie | |
| 7,539,527 B2 | 5/2009 | Jang | |
| 7,596,357 B2 | 9/2009 | Nakamata | |
| 7,633,355 B2 | 12/2009 | Matsuo | |
| 7,642,879 B2 | 1/2010 | Matsuno | |
| 7,667,663 B2 | 2/2010 | Hsiao | |
| 7,671,693 B2 | 3/2010 | Brobston et al. | |
| 7,705,692 B2 | 4/2010 | Fukamachi et al. | |
| 7,711,337 B2 * | 5/2010 | Mckinzie et al. | 455/248.1 |
| 7,714,676 B2 | 5/2010 | McKinzie | |
| 7,714,678 B2 | 5/2010 | du Toit et al. | |
| 7,728,693 B2 | 6/2010 | du Toit et al. | |
| 7,760,699 B1 | 7/2010 | Malik | |
| 7,768,400 B2 | 8/2010 | Lawrence et al. | |
| 7,786,819 B2 | 8/2010 | Ella | |
| 7,795,990 B2 | 9/2010 | du Toit | |
| 7,830,320 B2 | 11/2010 | Shamblin et al. | |
| 7,852,170 B2 | 12/2010 | McKinzie | |
| 7,856,228 B2 | 12/2010 | Lekutai et al. | |
| 7,865,154 B2 | 1/2011 | Mendolia | |
| 7,907,094 B2 | 3/2011 | Kakitsu et al. | |
| 7,917,104 B2 | 3/2011 | Manssen et al. | |
| 7,949,309 B2 | 5/2011 | Rofougaran | |
| 7,969,257 B2 | 6/2011 | du Toit | |
| 7,983,615 B2 | 7/2011 | Bryce et al. | |
| 7,991,363 B2 | 8/2011 | Greene | |
| 8,112,043 B2 | 2/2012 | Knudsen et al. | |
| 8,170,510 B2 | 5/2012 | Knudsen et al. | |
| 8,190,109 B2 | 5/2012 | Ali et al. | |
| 8,204,446 B2 | 6/2012 | Scheer | |
| 8,213,886 B2 | 7/2012 | Blin | |
| 8,217,731 B2 | 7/2012 | McKinzie et al. | |
| 8,217,732 B2 | 7/2012 | McKinzie | |
| 8,299,867 B2 | 10/2012 | McKinzie | |
| 8,320,850 B1 | 11/2012 | Khlat | |
| 8,325,097 B2 | 12/2012 | McKinzie, III et al. | |
| 8,405,563 B2 | 3/2013 | McKinzie et al. | |
| 8,421,548 B2 | 4/2013 | Spears et al. | |
| 8,432,234 B2 | 4/2013 | Manssen et al. | |
| 8,442,457 B2 | 5/2013 | Harel et al. | |
| 8,457,569 B2 | 6/2013 | Blin | |
| 8,472,888 B2 | 6/2013 | Manssen et al. | |
| 8,543,176 B1 | 9/2013 | Daniel et al. | |
| 8,558,633 B2 | 10/2013 | McKinzie, III | |
| 8,564,381 B2 | 10/2013 | McKinzie | |
| 8,594,584 B2 | 11/2013 | Greene et al. | |
| 8,620,236 B2 | 12/2013 | Manssen et al. | |
| 8,620,246 B2 | 12/2013 | McKinzie et al. | |
| 8,620,247 B2 | 12/2013 | McKinzie et al. | |
| 8,655,286 B2 | 2/2014 | Mendolia | |
| 8,674,783 B2 | 3/2014 | Spears et al. | |
| 8,680,934 B2 | 3/2014 | McKinzie et al. | |
| 8,693,963 B2 | 4/2014 | du Toit et al. | |
| 8,712,340 B2 | 4/2014 | Hoirup et al. | |
| 8,787,845 B2 | 7/2014 | Manssen et al. | |
| 8,957,742 B2 | 2/2015 | Spears et al. | |
| 9,026,062 B2 | 5/2015 | Greene et al. | |
| 9,119,152 B2 | 8/2015 | Blin | |
| 2002/0008672 A1 | 1/2002 | Gothard et al. | |
| 2002/0030566 A1 | 3/2002 | Bozler | |
| 2002/0079982 A1 | 6/2002 | Lafleur et al. | |
| 2002/0109642 A1 | 8/2002 | Gee et al. | |
| 2002/0118075 A1 | 8/2002 | Ohwada | |
| 2002/0145483 A1 | 10/2002 | Bouisse | |
| 2002/0167963 A1 | 11/2002 | Joa-Ng | |
| 2002/0183013 A1 | 12/2002 | Auckland et al. | |
| 2002/0187780 A1 | 12/2002 | Souissi | |
| 2002/0191703 A1 | 12/2002 | Ling | |
| 2002/0193088 A1 | 12/2002 | Jung | |
| 2003/0060227 A1 | 3/2003 | Sekine | |
| 2003/0071300 A1 | 4/2003 | Yashima | |
| 2003/0114124 A1 | 6/2003 | Higuchi | |
| 2003/0142022 A1 | 7/2003 | Ollikainen | |
| 2003/0193997 A1 | 10/2003 | Dent | |
| 2003/0199286 A1 | 10/2003 | du Toit | |
| 2003/0210206 A1 | 11/2003 | Phillips | |
| 2003/0216150 A1 | 11/2003 | Ueda | |
| 2003/0232607 A1 | 12/2003 | Le Bars | |
| 2004/0009754 A1 | 1/2004 | Smith, Jr. et al. | |
| 2004/0090372 A1 | 5/2004 | Nallo | |
| 2004/0100341 A1 | 5/2004 | Luetzelschwab | |
| 2004/0127178 A1 | 7/2004 | Kuffner | |
| 2004/0137950 A1 | 7/2004 | Bolin | |
| 2004/0202399 A1 | 10/2004 | Kochergin | |
| 2004/0227176 A1 | 11/2004 | York | |
| 2004/0232982 A1 | 11/2004 | Ichitsubo et al. | |
| 2004/0257293 A1 | 12/2004 | Friedrich | |
| 2004/0263411 A1 | 12/2004 | Fabrega-Sanchez et al. | |
| 2005/0007291 A1 | 1/2005 | Fabrega-Sanchez | |
| 2005/0032488 A1 | 2/2005 | Pehlke | |
| 2005/0032541 A1 | 2/2005 | Wang | |
| 2005/0042994 A1 | 2/2005 | Otaka | |
| 2005/0059362 A1 | 3/2005 | Kalajo et al. | |
| 2005/0082636 A1 | 4/2005 | Yashima | |
| 2005/0085204 A1 | 4/2005 | Poilasne et al. | |
| 2005/0093624 A1 | 5/2005 | Forrester et al. | |
| 2005/0130608 A1 | 6/2005 | Forse | |
| 2005/0130699 A1 | 6/2005 | Kim | |
| 2005/0208960 A1 | 9/2005 | Hassan | |
| 2005/0215204 A1 | 9/2005 | Wallace | |
| 2005/0227627 A1 | 10/2005 | Cyr et al. | |
| 2005/0227633 A1 | 10/2005 | Dunko | |
| 2005/0259011 A1 | 11/2005 | Vance | |
| 2005/0260962 A1 | 11/2005 | Nazrul et al. | |
| 2005/0264455 A1 | 12/2005 | Talvitie | |
| 2005/0280588 A1 | 12/2005 | Fujikawa et al. | |
| 2005/0282503 A1 | 12/2005 | Onno | |
| 2006/0003537 A1 | 1/2006 | Sinha | |
| 2006/0009165 A1 | 1/2006 | Alles | |
| 2006/0030277 A1 | 2/2006 | Cyr et al. | |
| 2006/0077082 A1 | 4/2006 | Shanks et al. | |
| 2006/0099615 A1 | 5/2006 | Laroia et al. | |
| 2006/0119511 A1 * | 6/2006 | Collinson | 342/368 |
| 2006/0148415 A1 | 7/2006 | Hamalainen et al. | |
| 2006/0160501 A1 | 7/2006 | Mendolia | |
| 2006/0183431 A1 | 8/2006 | Chang et al. | |
| 2006/0183433 A1 | 8/2006 | Mori et al. | |
| 2006/0183442 A1 | 8/2006 | Chang et al. | |
| 2006/0195161 A1 | 8/2006 | Li et al. | |
| 2006/0205368 A1 | 9/2006 | Bustamante | |
| 2006/0281423 A1 | 12/2006 | Caimi | |
| 2007/0001924 A1 | 1/2007 | Hirabayashi et al. | |
| 2007/0013483 A1 | 1/2007 | Stewart | |
| 2007/0035458 A1 | 2/2007 | Ohba et al. | |
| 2007/0042725 A1 | 2/2007 | Poilasne | |
| 2007/0042734 A1 | 2/2007 | Ryu | |
| 2007/0063788 A1 | 3/2007 | Zhu | |
| 2007/0077956 A1 | 4/2007 | Julian et al. | |
| 2007/0080888 A1 | 4/2007 | Mohamadi | |

(56) References Cited

U.S. PATENT DOCUMENTS

| | | |
|---|---|---|
| 2007/0082611 A1 | 4/2007 | Terranova et al. |
| 2007/0085609 A1 | 4/2007 | Itkin et al. |
| 2007/0091006 A1 | 4/2007 | Thober et al. |
| 2007/0111681 A1 | 5/2007 | Alberth et al. |
| 2007/0142011 A1 | 6/2007 | Shatara |
| 2007/0142014 A1 | 6/2007 | Wilcox |
| 2007/0149146 A1 | 6/2007 | Hwang |
| 2007/0171879 A1 | 7/2007 | Bourque |
| 2007/0182636 A1 | 8/2007 | Carlson |
| 2007/0184825 A1 | 8/2007 | Lim et al. |
| 2007/0194859 A1 | 8/2007 | Brobston |
| 2007/0197180 A1 | 8/2007 | McKinzie et al. |
| 2007/0200766 A1 | 8/2007 | McKinzie |
| 2007/0200773 A1 | 8/2007 | Dou et al. |
| 2007/0210899 A1 | 9/2007 | Kato et al. |
| 2007/0248238 A1* | 10/2007 | Abreu ............ 381/381 |
| 2007/0285326 A1 | 12/2007 | McKinzie |
| 2007/0293176 A1 | 12/2007 | Yu |
| 2008/0007478 A1 | 1/2008 | Jung |
| 2008/0018541 A1 | 1/2008 | Pang |
| 2008/0030165 A1 | 2/2008 | Lisac et al. |
| 2008/0055016 A1 | 3/2008 | Morris |
| 2008/0055168 A1 | 3/2008 | Massey et al. |
| 2008/0081670 A1 | 4/2008 | Rofougaran |
| 2008/0090539 A1 | 4/2008 | Thompson |
| 2008/0094149 A1 | 4/2008 | Brobston |
| 2008/0106350 A1 | 5/2008 | McKinzie |
| 2008/0122553 A1 | 5/2008 | McKinzie |
| 2008/0122723 A1 | 5/2008 | Rofougaran |
| 2008/0129612 A1 | 6/2008 | Wang |
| 2008/0158076 A1 | 7/2008 | Walley |
| 2008/0174508 A1 | 7/2008 | Iwai et al. |
| 2008/0261544 A1 | 10/2008 | Blin |
| 2008/0274706 A1 | 11/2008 | Blin et al. |
| 2008/0285729 A1 | 11/2008 | Glasgow et al. |
| 2008/0294718 A1 | 11/2008 | Okano |
| 2008/0300027 A1 | 12/2008 | Dou et al. |
| 2008/0305749 A1 | 12/2008 | Ben-Bassat |
| 2008/0305750 A1 | 12/2008 | Alon et al. |
| 2008/0309617 A1 | 12/2008 | Kong et al. |
| 2009/0002077 A1 | 1/2009 | Rohani et al. |
| 2009/0027286 A1 | 1/2009 | Ohishi |
| 2009/0039976 A1 | 2/2009 | McKinzie, III |
| 2009/0082017 A1 | 3/2009 | Chang et al. |
| 2009/0109880 A1 | 4/2009 | Kim et al. |
| 2009/0121963 A1 | 5/2009 | Greene |
| 2009/0149136 A1 | 6/2009 | Rofougaran |
| 2009/0180403 A1 | 7/2009 | Tudosoiu |
| 2009/0184879 A1 | 7/2009 | Derneryd |
| 2009/0196192 A1 | 8/2009 | Lim et al. |
| 2009/0215446 A1 | 8/2009 | Hapsari et al. |
| 2009/0231220 A1 | 9/2009 | Zhang et al. |
| 2009/0253385 A1 | 10/2009 | Dent et al. |
| 2009/0264065 A1 | 10/2009 | Song |
| 2009/0278685 A1 | 11/2009 | Potyrailo |
| 2009/0295651 A1 | 12/2009 | Dou et al. |
| 2009/0323572 A1 | 12/2009 | Shi et al. |
| 2009/0323582 A1 | 12/2009 | Proctor et al. |
| 2010/0041348 A1 | 2/2010 | Wilcox et al. |
| 2010/0053009 A1 | 3/2010 | Rofougaran |
| 2010/0060531 A1 | 3/2010 | Rappaport |
| 2010/0073103 A1 | 3/2010 | Spears et al. |
| 2010/0085260 A1 | 4/2010 | McKinzie |
| 2010/0085884 A1 | 4/2010 | Srinivasan et al. |
| 2010/0105425 A1 | 4/2010 | Asokan |
| 2010/0107067 A1 | 4/2010 | Vaisanen et al. |
| 2010/0134215 A1 | 6/2010 | Lee et al. |
| 2010/0156552 A1 | 6/2010 | McKinzie |
| 2010/0214189 A1 | 8/2010 | Kanazawa |
| 2010/0232474 A1 | 9/2010 | Rofougaran et al. |
| 2010/0244576 A1 | 9/2010 | Hillan et al. |
| 2010/0285836 A1 | 11/2010 | Horihata et al. |
| 2010/0302106 A1 | 12/2010 | Knudsen et al. |
| 2010/0304688 A1 | 12/2010 | Knudsen |
| 2011/0002080 A1 | 1/2011 | Ranta |
| 2011/0012790 A1 | 1/2011 | Badaruzzaman |
| 2011/0014879 A1 | 1/2011 | Alberth et al. |
| 2011/0043328 A1 | 2/2011 | Bassali |
| 2011/0086600 A1 | 4/2011 | Muhammad |
| 2011/0086630 A1 | 4/2011 | Manssen et al. |
| 2011/0102290 A1 | 5/2011 | Milosavljevic |
| 2011/0105023 A1 | 5/2011 | Scheer et al. |
| 2011/0116423 A1 | 5/2011 | Rousu et al. |
| 2011/0117863 A1 | 5/2011 | Camp, Jr. et al. |
| 2011/0117973 A1 | 5/2011 | Asrani et al. |
| 2011/0121079 A1 | 5/2011 | Lawrence et al. |
| 2011/0122040 A1 | 5/2011 | Wakabayashi et al. |
| 2011/0133994 A1 | 6/2011 | Korva |
| 2011/0140982 A1 | 6/2011 | Ozden et al. |
| 2011/0183628 A1 | 7/2011 | Baker |
| 2011/0183633 A1 | 7/2011 | Ohba et al. |
| 2011/0195679 A1 | 8/2011 | Lee et al. |
| 2011/0237207 A1 | 9/2011 | Bauder |
| 2011/0249760 A1 | 10/2011 | Chrisikos et al. |
| 2011/0256857 A1 | 10/2011 | Chen et al. |
| 2011/0281532 A1 | 11/2011 | Shin et al. |
| 2011/0299438 A1 | 12/2011 | Mikhemar et al. |
| 2011/0306310 A1 | 12/2011 | Bai |
| 2011/0309980 A1 | 12/2011 | Ali et al. |
| 2012/0051409 A1 | 3/2012 | Brobston et al. |
| 2012/0062431 A1 | 3/2012 | Tikka et al. |
| 2012/0075159 A1 | 3/2012 | Chang |
| 2012/0084537 A1 | 4/2012 | Indukuru et al. |
| 2012/0094708 A1 | 4/2012 | Park |
| 2012/0100802 A1 | 4/2012 | Mohebbi |
| 2012/0112851 A1 | 5/2012 | Manssen |
| 2012/0112852 A1 | 5/2012 | Manssen et al. |
| 2012/0119843 A1 | 5/2012 | du Toit et al. |
| 2012/0119844 A1 | 5/2012 | du Toit et al. |
| 2012/0214421 A1 | 8/2012 | Hoirup |
| 2012/0220243 A1 | 8/2012 | Mendolia |
| 2012/0243579 A1 | 9/2012 | Premakanthan et al. |
| 2012/0286586 A1 | 11/2012 | Balm |
| 2012/0293384 A1 | 11/2012 | Knudsen et al. |
| 2012/0295554 A1 | 11/2012 | Greene et al. |
| 2012/0295555 A1 | 11/2012 | Greene et al. |
| 2013/0005277 A1 | 1/2013 | Klomsdorf et al. |
| 2013/0052967 A1 | 2/2013 | Black et al. |
| 2013/0056841 A1 | 3/2013 | Hsieh et al. |
| 2013/0076579 A1 | 3/2013 | Zhang et al. |
| 2013/0076580 A1 | 3/2013 | Zhang et al. |
| 2013/0106332 A1 | 5/2013 | Williams et al. |
| 2013/0122829 A1 | 5/2013 | Hyvonen et al. |
| 2013/0137384 A1 | 5/2013 | Desclos et al. |
| 2013/0154897 A1 | 6/2013 | Sorensen et al. |
| 2013/0215846 A1 | 8/2013 | Yerrabommanahalli et al. |
| 2013/0293425 A1 | 11/2013 | Zhu et al. |
| 2013/0315285 A1 | 11/2013 | Black et al. |
| 2014/0002323 A1 | 1/2014 | Ali et al. |

FOREIGN PATENT DOCUMENTS

| | | |
|---|---|---|
| DE | 102008050743 | 4/2010 |
| DE | 102009018648 A1 | 10/2010 |
| EP | 0685936 | 6/1995 |
| EP | 090902 | 4/1999 |
| EP | 0909024 | 4/1999 |
| EP | 1079296 | 2/2001 |
| EP | 1137192 | 9/2001 |
| EP | 1298810 | 4/2006 |
| EP | 2214085 A2 | 8/2010 |
| EP | 2328233 | 6/2011 |
| EP | 2388925 A1 | 11/2011 |
| EP | 2424119 A1 | 2/2012 |
| JP | 03276901 | 3/1990 |
| JP | 9321526 | 12/1997 |
| JP | 102097 | 8/1998 |
| JP | 10209722 | 8/1998 |
| JP | 2005-130441 | 5/2005 |
| KR | 100645526 | 11/2006 |
| KR | 10-0740177 | 7/2007 |
| WO | 01/71846 | 9/2001 |
| WO | 2006/031170 | 3/2006 |
| WO | 2008/030165 | 3/2008 |

(56) References Cited

FOREIGN PATENT DOCUMENTS

| | | |
|---|---|---|
| WO | WO-2009/064968 | 5/2009 |
| WO | 2009/108391 A1 | 9/2009 |
| WO | 2009/155966 | 12/2009 |
| WO | 2010028521 A1 | 3/2010 |
| WO | 2010121914 A1 | 10/2010 |
| WO | WO-2011/044592 | 4/2011 |
| WO | 2011/084716 | 7/2011 |
| WO | 2011084716 A1 | 7/2011 |
| WO | 2011102143 A1 | 8/2011 |
| WO | WO-2011/133657 | 10/2011 |
| WO | WO-2011028453 | 10/2011 |
| WO | 2012/067622 | 5/2012 |
| WO | 2012/085932 | 6/2012 |

OTHER PUBLICATIONS

Bezooijen, A. et al., "A GSM/EDGE/WCDMA Adaptive Series-LC Matching Network Using RF-MEMS Switches", IEEE Journal of Solid-State Circuits, vol. 43, No. 10, Oct. 2008, 2259-2268.

Du Toit, , "Tunable Microwave Devices With Auto Adjusting Matching Circuit", U.S. Appl. No. 13/302,617, filed Nov. 22, 2011.

Du Toit, "Tunable Microwave Devices With Auto—Adjusting Matching Circuit", U.S. Appl. No. 13/302,649, filed Nov. 22, 2011.

Greene, , "Method and Apparatus for Tuning a Communication Device", U.S. Appl. No. 13/108,463, filed May 16, 2011.

Greene, , "Method and Apparatus for Tuning a Communication Device", U.S. Appl. No. 13/108,589, filed May 16, 2011.

Hoirup, , "Method and Apparatus for Radio Antenna Frequency Tuning", U.S. Appl. No. 13/030,177, filed Feb. 18, 2011.

Huang, Libo et al., "Theoretical and experimental investigation of adaptive antenna impedance matching for multiband mobile phone applications", IEEE, Sep. 7, 205, 13-17.

Hyun, S. , "Effects of strain on the dielectric properties of tunable dielectric SrTi03 thin films", Applied Physics Letters, 2004 American Institute of Physics.

Ida, I. et al., "An Adaptive Impedence Matching System and Its Application to Mobile Antennas", TENCON 2004, IEEE Region 10 Conference, See Abstract ad p. 544, Nov. 21-24, 2004, 543-547.

Katsuya, K. , "Hybrid Integrated Circuit Device", Patent Abstracts of Japan, Publication No. 03-276901, Date of publication of application: Sep. 12, 1991.

Manssen, , "Method and Apparatus for Managing Interference in a Communication Device", U.S. Appl. No. 61/326,206, filed Apr. 20, 2010.

Manssen, , "Method and Apparatus for Tuning Antennas in a Communication Device", U.S. Appl. No. 12/941,972, filed Nov. 8, 2010.

Manssen, , "Method and Apparatus for Tuning Antennas in a Communication Device", U.S. Appl. No. 13/005,122, filed Jan. 12, 2011.

McKinzie, , "Adaptive Impedance Matching Module (AIMM) Control Architectures", U.S. Appl. No. 13/293,544, filed Nov. 10, 2011.

McKinzie, , "Adaptive Impedance Matching Module (AIMM) Control Architectures", U.S. Appl. No. 13/293,550, filed Nov. 10, 2011.

McKinzie, , "Method and Apparatus for Adaptive Impedance Matching", U.S. Appl. No. 13/217,748, filed Aug. 25, 2011.

Mendolia, , "Method and Apparatus for Tuning a Communication Device", U.S. Appl. No. 13/035,417, filed Feb. 25, 2011.

Paratek Microwave, Inc., , "Method and Apparatus for Tuning Antennas in a Communication Device", International Application No. PCT/US11/59620, filed Nov. 7, 2011.

Patent Cooperation Treaty, , "International Search Report and Written Opinion", International Application No. PCT/US2010/046241, Mar. 2, 2011.

Patent Cooperation Treaty, "International Search Report and Written Opinion", International Application No. PCT/US2010/056413, Jul. 27, 2011.

Patent Cooperation Treaty, "International Search Report and Written Opinion", Nov. 16, 2011, International Application No. PCT/US/2011/038543.

Patent Cooperation Treaty, , "International Search Report and Written Opinion", PCT Application No. PCT/US08/005085, Jul. 2, 2008.

Payandehjoo, Kasra , "Novel Techniques for Coupling Reduction in Multi-Antenna Hand-held Devices", IEEE Student Member, 1-8.

Pervez, N.K. , "High Tunability barium strontium titanate thin films for RF circuit applications", Applied Physics Letters, 2004 American Institute of Physics.

Petit, Laurent , "MEMS-Switched Parasitic-Antenna Array for Radiation Pattern Diversity", IEEE Transactions on Antennas and Propagation, vol. 54, No. 9, Sep. 2009, 2624-2631.

Qiao, et al., "Antenna Impedance Mismatch Measurement and Correction for Adaptive COMA Transceivers", IEEE, 2005.

Qiao, et al., "Measurement of Antenna Load Impedance for Power Amplifiers", The Department of Electrical and Computer Engineering, University of California, San Diego, Sep. 13, 2004.

Spears, "Methods for Tuning an Adaptive Impedance Matching Network With a Look-Up Table", U.S. Appl. No. 13/297,951, filed Nov. 16, 2011.

Stemmer, Susanne, "Low-loss tunable capacitors fabricated directly on gold bottom electrodes", University of California Postprints 2006.

Taylor, T.R. , "Impact of thermal strain on the dielectric constant of sputtered barium strontium titanate thin films", Applied Physics Letters, 2002 American Institute of Physics.

Tombak, Ali "Tunable Barium Strontium Titanate Thin Film Capacitors for RF and Microwave Applications", IEEE Microwave and Wireles Components Letters, vol. 12, Jan. 2002.

Xu, Hongtao , "Tunable Microwave Integrated Circuits using BST Thin Film Capacitors with Device", Integrated Ferroelectrics, Department of Electrical Engineering and Computer Engineering, University of California, 2005.

Zuo, S. , "Eigenmode Decoupling for Mimo Loop-Antenna Based on 180 Coupler", Progress in Electromagnetics Research Letters, vol. 26, 2011, 11-20.

\* cited by examiner

LOOK-UP TABLE

| |
|---|
| Band 1; Use Case 1; Desired tuning state |
| Band 1; Use Case 2; Desired tuning state |
| ⋮ |
| Band 1; Use Case n; Desired tuning state |
| Band 2; Use Case 1; Desired tuning state |
| Band 2; Use Case 2; Desired tuning state |
| ⋮ |
| Band 2; Use Case n; Desired tuning state |
| ⋮ |
| Band N; Use Case 1; Desired tuning state |
| Band N; Use Case 2; Desired tuning state |
| ⋮ |
| Band N; Use Case n; Desired tuning state |

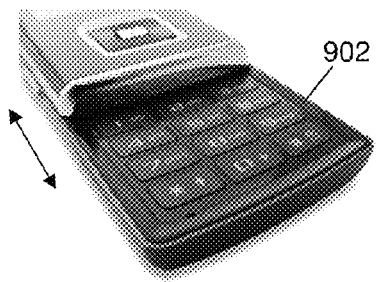
900
FIG. 9
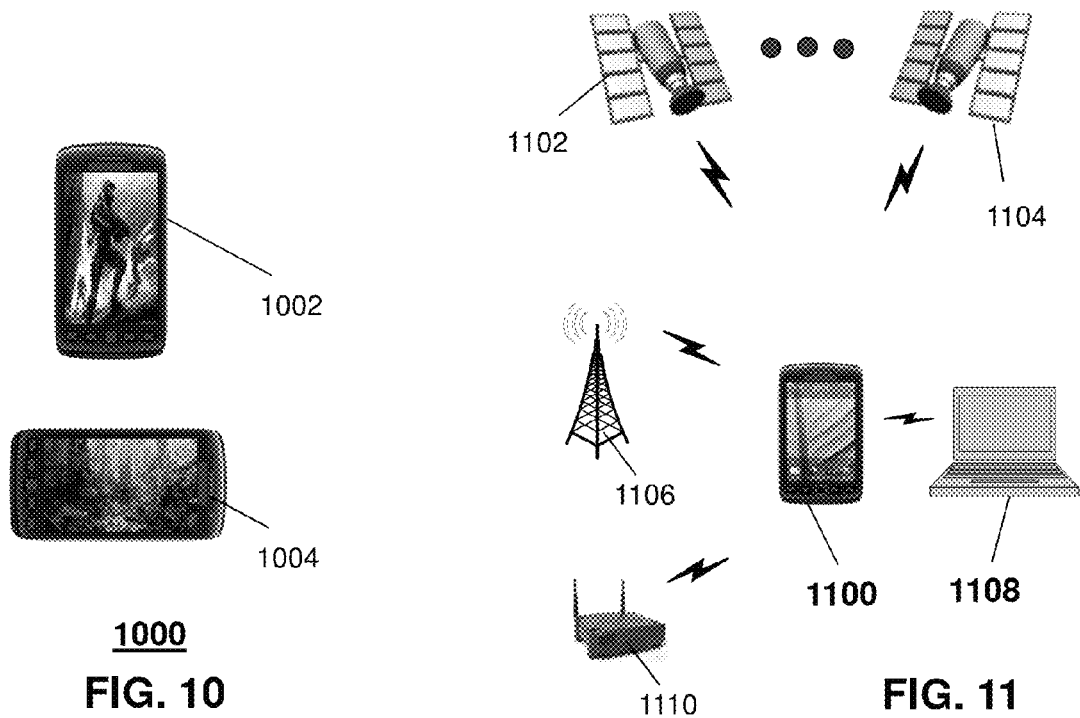
1000
FIG. 10
FIG. 11

Antenna
Coupling Area

Antenna
Coupling Area

1300

1700

METHOD AND APPARATUS FOR BEAM FORMING AND ANTENNA TUNING IN A COMMUNICATION DEVICE

FIELD OF THE DISCLOSURE

The subject disclosure relates to a communication device performance, and in particular, to a method and apparatus for beam forming and antenna tuning in a communication device.

BACKGROUND

Cellular telephone devices have migrated to support multi-cellular access technologies, peer-to-peer access technologies, personal area network access technologies, and location receiver access technologies, which can operate concurrently. Cellular telephone devices in the form of smartphones have also integrated a variety of consumer features such as MP3 players, color displays, gaming applications, cameras, and other features. Cellular telephone devices can be required to communicate at a variety of frequencies, and in some instances are subjected to a variety of physical and function use conditions.

As mobile communication technology continues to develop, users will likely desire higher quality of services and the ability to utilize more and more features and services.

BRIEF DESCRIPTION OF THE DRAWINGS

Reference will now be made to the accompanying drawings, which are not necessarily drawn to scale, and wherein:

FIG. 7 depicts an illustrative embodiment of a look-up table utilized by the communication device of FIG. 1 for controlling tunable reactive networks of FIGS. 1-6;

FIGS. 8a-11 depict illustrative physical and operational use cases of a communication device that can perform antenna tuning and power consumption management;

DETAILED DESCRIPTION

Figure 1:
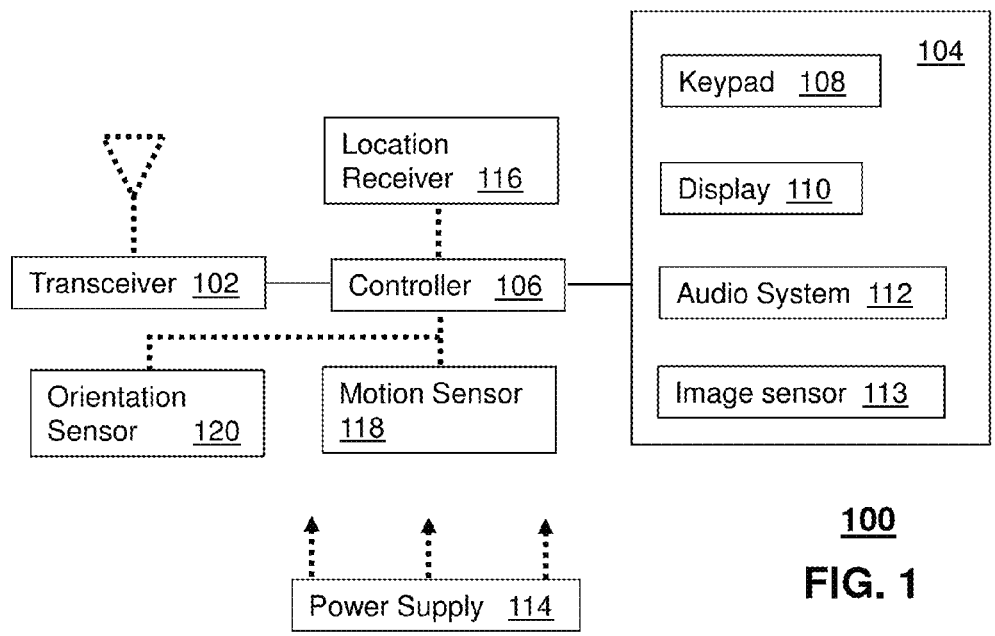
FIG. 1 depicts an illustrative embodiment of a communication device that can perform antenna tuning and/or power consumption management.

The subject disclosure describes, among other things, illustrative embodiments of enhancing communication device performance through selective beam forming utilizing amplitude and/or phase shifters to reduce antenna gain towards an interference signal. The selective beam forming can be applied to outside and/or inside interference. In one or more embodiments, antenna beam forming and antenna isolation can be applied in a mobile communication device to improve inside interference (also known as self de-sensing) between radios of the mobile communication device in conjunction with improving radiated throughput.

In one or more embodiments, the magnitude and/or phase of antenna(s) can be adjusted to realize desired antenna beam forming and/or desired antenna isolation, including between GSM/CDMA/WCDMA/LTE antennas and RF connectivity antennas, such as WLAN and Bluetooth antennas.

In one or more embodiments, reactive element adjustments can be applied to an antenna matching circuit and its associated conductive structure with tunable area, tunable shape, and tunable coupling factor to the main ground. This can enable adjustment of a first antenna (such as LTE B7 antenna) pattern without the involvement of a second antenna, and reduce the coupling to another antenna (such as 2.4 GHz WLAN antenna).

One embodiment of the subject disclosure includes a mobile communication device which has a plurality of antennas including radiating elements. The mobile communication device has phase shifters connected with the radiating elements, a memory storing computer instructions, and a processor coupled to the memory and the phase shifters. The processor, responsive to executing the computer instructions, performs operations including obtaining Received Signal Strength Indicator (RSSI) data, performing beam forming based on the RSSI data utilizing the phase shifters, and determining whether a throughput threshold can be satisfied. The processor adjusts the beam forming utilizing the phase shifters responsive to a determination that the throughput threshold cannot be satisfied. The adjusting of the beam forming can be based on forming a desired antenna pattern that increases radiated throughput and reduces antenna coupling among the plurality of antennas.

One embodiment of the subject disclosure includes a method comprising determining, by a controller circuit of a communication device, antenna coupling among a plurality of antennas of the communication device. The method can include adjusting, by the controller circuit, beam forming for the plurality of antennas utilizing phase shifters coupled with radiating elements of the plurality of antennas. The adjusting of the beam forming can be based on forming a desired antenna pattern that increases radiated throughput and reduces the antenna coupling among the plurality of antennas.

One embodiment of the subject disclosure includes a mobile communication device having a transceiver and an antenna assembly that is coupled with the transceiver. The antenna assembly includes a first structure with a first ground, a second structure with a second ground, and a plurality of tunable capacitors connected between the first and second structures. The antenna assembly can include an antenna having a feed point and a radiating element. The feed point can be connected with the first structure. The radiating element can be connected with the second structure.

One or more of the exemplary embodiments can provide for antenna tuning based on quality of service parameter(s) and/or through power consumption management (e.g., reduction of transmit power without sacrificing desired throughput). In one or more embodiments, layers of tuning can be performed utilizing a matching network having one or more adjustable reactive elements, where the tuning layers utilize different parameters and/or goals. For example, a first layer of tuning can be performed based on tuning toward a pre-determined match (e.g., a 50Ω match or other desired match value). The first tuning layer can be an open-loop process and/or a closed loop process. A second layer of tuning can be performed based on use cases (e.g., a physical and/or operational state(s) of the communication device) and based on Total Radiated Power (TRP) and/or Total Isotropic Sensitivity (TIS). A third layer of tuning can be performed based on radiated throughput of the communication device, including Uplink (UL) and Downlink (DL) throughput. Any one or more of these tuning layers can be utilized alone or in combination with each other, and they can be utilized in various orders, including the order in the above-described example.

In one embodiment, transmit power for the communication device can be adjusted (e.g., reduced) when the radiated throughput is in a desired range (e.g., satisfies a throughput threshold). In another embodiment, the third layer of tuning can include adjusting the matching network when the radiated throughput is outside of a desired range (e.g., does not satisfy the throughput threshold). The throughput threshold can be determined based on a number of different factors, including a modulation scheme being utilized, signal strength, information provided from a remote source such as a base station, and so forth.

In one embodiment, a closed-loop tuning process can be utilized so that the antenna matching circuit is tuned towards a pre-determined match across operating Tx and Rx bands. In another embodiment, the closed-loop tuning process can be implemented for the best or better and respective TRP and TIS in each pre-defined use case (e.g., free space, handheld, handheld close to head, on-a-metal table, speaker-phone operation, etc.). In another embodiment, calibration can be performed under each pre-defined use case, where the calibration goal is not the best TRP and TIS, but rather the best or better UL and DL throughputs. In one embodiment, the closed-loop process during a Rx mode (e.g., when the Rx band is different from Tx band) can utilize a pre-defined TIS for a specific use case as a starting point and can tune based on the DL throughput. Other embodiments are contemplated by the subject disclosure.

One embodiment of the subject disclosure includes a mobile communication device having a matching network including an adjustable reactive element, an antenna coupled with the matching network, a memory storing computer instructions, and a processor coupled to the memory and the matching network. The processor, responsive to executing computer instructions, performs operations including identifying a use case for the mobile communication device. The processor retrieves a tuning value from a look-up table of the memory that correspond to the use case, where the tuning value is empirical data based on at least one of a total radiated power or a total isotropic sensitivity. The processor tunes the matching network based on the tuning value. The processor determines radiated throughput for at least one of an uplink throughput or a downlink throughput. The processor reduces transmit power responsive to the radiated throughput satisfying a throughput threshold. The processor tunes the matching network responsive to the radiated throughput not satisfying the throughput threshold.

One embodiment of the subject disclosure includes a method in which a controller circuit of a communication device determines a radiated throughput for at least one of an uplink throughput or a downlink throughput of the communication device. The method includes reducing transmit power for the communication device responsive to the radiated throughput satisfying a throughput threshold. The method includes tuning, by the controller circuit, a matching network of the communication device responsive to the radiated throughput not satisfying the throughput threshold.

One embodiment of the subject disclosure includes a mobile communication device having a matching network including an adjustable reactive element, an antenna coupled with the matching network, and a controller circuit coupled to the matching network. The controller circuit, responsive to executing computer instructions, performs operations including adjusting transmit power responsive to a radiated throughput satisfying a throughput threshold, and tuning the matching network responsive to the radiated throughput not satisfying the throughput threshold.

Other tuning techniques and components can be utilized with the exemplary embodiments, including the techniques and components described in U.S. application Ser. No. 13/552,804 filed contemporaneously herewith entitled "METHOD AND APPARATUS FOR ANTENNA TUNING AND POWER CONSUMPTION MANAGEMENT IN A COMMUNICATION DEVICE," as well as U.S. application Ser. No. 13/552,753 filed contemporaneously herewith entitled "MOBILE DEVICE WITH SELECTIVE WLAN RECEIVE GAIN LEVELS AND RELATED METHODS." The disclosures of both of these applications are incorporated by reference herein in their entirety.

FIG. 1 depicts an illustrative embodiment of a communication device 100 that can perform antenna tuning, including based on quality of service metrics, such as UL and/or DL throughput. The communication device 100 can adjust transmit power based on a comparison of radiated throughput with a throughput threshold and can also perform antenna tuning when the radiated throughput is at an undesired level. The communication device 100 can comprise a wireline and/or wireless transceiver 102 having transmitter and receiver sections (herein transceiver 102), a user interface (UI) 104, a power supply 114, a location receiver 116, a motion sensor 118, an orientation sensor 120, and a controller 106 for managing operations thereof. The transceiver 102 can support short-range or long-range wireless access technologies such as Bluetooth, ZigBee, WiFi, DECT, or cellular communication technologies, just to mention a few. Cellular technologies can include, for example, CDMA-1X, UMTS/HSDPA, GSM/GPRS, TDMA/EDGE, EV/DO, WiMAX, SDR, LTE, as well as other next generation wireless communication technologies as they arise. The transceiver 102 can also be adapted to support circuit-switched wireline access technologies (such as PSTN), packet-switched wireline access technologies (such as TCP/IP, VoIP, etc.), and combinations thereof.

The UI 104 can include a depressible or touch-sensitive keypad 108 with a navigation mechanism such as a roller ball, a joystick, a mouse, or a navigation disk for manipulating operations of the communication device 100. The keypad 108 can be an integral part of a housing assembly of the communication device 100 or an independent device operably coupled thereto by a tethered wireline interface (such as a USB cable) or a wireless interface supporting, for example, Bluetooth. The keypad 108 can represent a numeric keypad commonly used by phones, and/or a QWERTY keypad with alphanumeric keys. The UI 104 can further include a display 110 such as monochrome or color LCD (Liquid Crystal Display), OLED (Organic Light Emitting Diode) or other suitable display technology for conveying images to an end user of the communication device 100. In an embodiment where the display 110 is touch-sensitive, a portion or all of the keypad 108 can be presented by way of the display 110 with navigation features.

The display 110 can use touch screen technology to also serve as a user interface for detecting user input. As a touch screen display, the communication device 100 can be adapted to present a user interface with graphical user interface (GUI) elements that can be selected by a user with a touch of a finger. The touch screen display 110 can be equipped with capacitive, resistive or other forms of sensing technology to detect how much surface area of a user's finger has been placed on a portion of the touch screen display. This sensing information can be used to control the manipulation of the GUI elements or other functions of the user interface. The display 110 can be an integral part of the housing assembly of the communication device 100 or an independent device communicatively coupled thereto by a tethered wireline interface (such as a cable) or a wireless interface.

The UI 104 can also include an audio system 112 that utilizes audio technology for conveying low volume audio (such as audio heard in proximity of a human ear) and high volume audio (such as speakerphone for hands free operation). The audio system 112 can further include a microphone for receiving audible signals of an end user. The audio system 112 can also be used for voice recognition applications. The UI 104 can further include an image sensor 113 such as a charged coupled device (CCD) camera for capturing still or moving images.

The power supply 114 can utilize common power management technologies such as replaceable and rechargeable batteries, supply regulation technologies, and/or charging system technologies for supplying energy to the components of the communication device 100 to facilitate long-range or short-range portable applications. Alternatively, or in combination, the charging system can utilize external power sources such as DC power supplied over a physical interface such as a USB port or other suitable tethering technologies.

The location receiver 116 can utilize location technology such as a global positioning system (GPS) receiver capable of assisted GPS for identifying a location of the communication device 100 based on signals generated by a constellation of GPS satellites, which can be used for facilitating location services such as navigation. The motion sensor 118 can utilize motion sensing technology such as an accelerometer, a gyroscope, or other suitable motion sensing technology to detect motion of the communication device 100 in three-dimensional space. The orientation sensor 120 can utilize orientation sensing technology such as a magnetometer to detect the orientation of the communication device 100 (north, south, west, and east, as well as combined orientations in degrees, minutes, or other suitable orientation metrics).

The communication device 100 can use the transceiver 102 to also determine a proximity to a cellular, WiFi, Bluetooth, or other wireless access points by sensing techniques such as utilizing a received signal strength indicator (RSSI) and/or signal time of arrival (TOA) or time of flight (TOF) measurements. The controller 106 can utilize computing technologies such as a microprocessor, a digital signal processor (DSP), and/or a video processor with associated storage memory such as Flash, ROM, RAM, SRAM, DRAM or other storage technologies for executing computer instructions, controlling, and processing data supplied by the aforementioned components of the communication device 100.

Other components not shown in FIG. 1 are contemplated by the subject disclosure. The communication device 100 can include a slot for inserting or removing an identity module such as a Subscriber Identity Module (SIM) card. SIM cards can be used for identifying and registering for subscriber services, executing computer programs, storing subscriber data, and so forth.

The communication device 100 as described herein can operate with more or less of the circuit components shown in FIG. 1.

Figure 2:
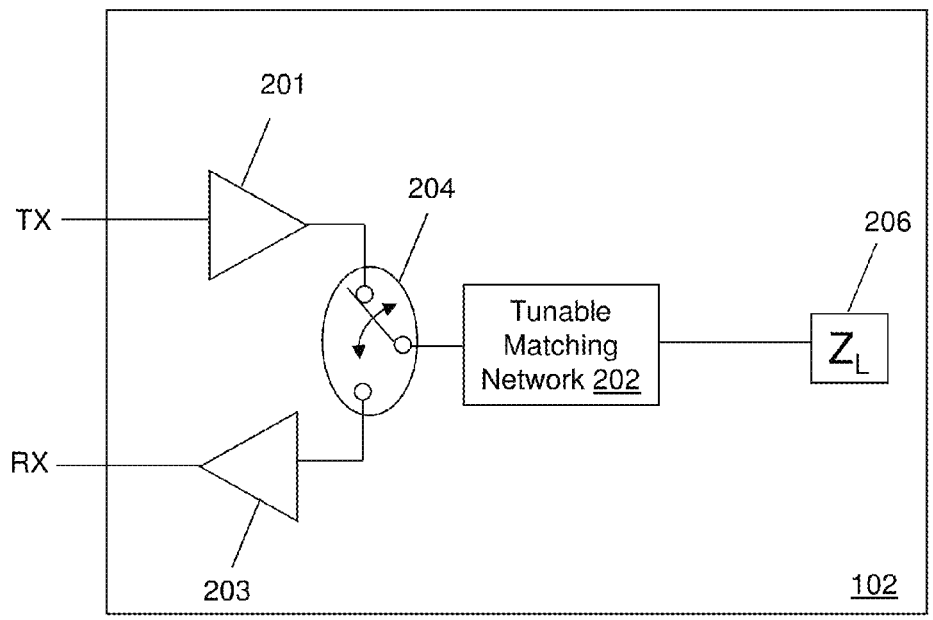
FIG. 2 depicts an illustrative embodiment of a portion of a transceiver of the communication device of FIG. 1.
Figure 16:
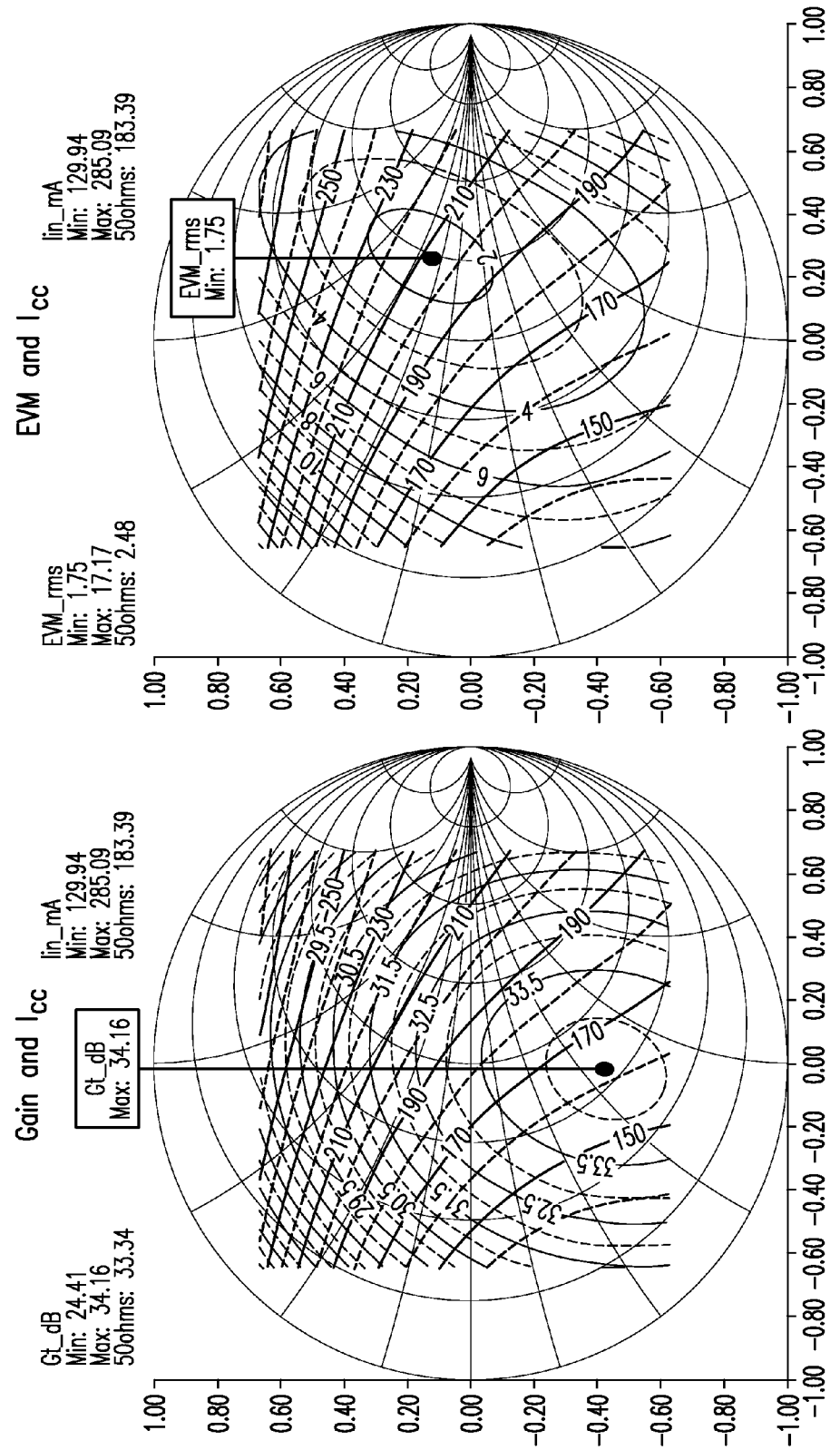
FIG. 16 depicts load pull test results of a WLAN RF power amplifier with respect to output power and error vector magnitude.

FIG. 2 depicts an illustrative embodiment of a portion of the wireless transceiver 102 of the communication device 100 of FIG. 1. In GSM applications, the transmit and receive portions of the transceiver 102 can include amplifiers 201, 203 coupled to a tunable matching network 202 that is in turn coupled to an impedance load 206. The impedance load 206 in the present illustration can be an antenna as shown in FIG. 1 (herein antenna 206). A transmit signal in the form of a radio frequency (RF) signal (Tx) can be directed to the amplifier 201 which amplifies the signal and directs the amplified signal to the antenna 206 by way of the tunable matching network 202 when switch 204 is enabled for a transmission session. The receive portion of the transceiver 102 can utilize a pre-amplifier 203 which amplifies signals received from the antenna 206 by way of the tunable matching network 202 when switch 204 is enabled for a receive session. The tunable matching network 202 can be tuned based on various parameters and using various techniques, including open-loop and/or closed-loop processes. As an example, the tunable matching network 202 can be tuned based on TRP and TIS by utilizing stored tuning data for particular use cases, where the communication device is able to identify the use case for a particular communication session. Continuing with this example, the tunable matching network 202 can be further tuned based on quality of service parameters, such as the radiated UL and/or DL throughput. For instance, during a Tx mode, a comparison can be performed between the radiated UL throughput and an ideal or desired UL throughput (e.g., a threshold throughput). If the comparison indicates that the radiated UL throughput is in a desired range then the transmit power can be reduced (e.g., via a pre-determined reduction step). This reduction can be an iterative process whereby the transmit power is reduced while maintaining the UL throughput in the desired range. If on the other hand, the comparison indicates that the radiated UL throughput is outside of the desired range then adjustments can be performed to enhance the quality of service of the communication device, such as tuning the matching network to drive the UL throughput toward the desired range. For instance, a better UL throughput can be achieved by presenting the load impedance to Tx Power Amplifier 201, which would provide better trade-off between the TRP and Error Vector Magnitude (EVM). As shown in FIG. 16, the best TRP may not translate to the best EVM, where the antenna load impedances are very far away between the highest power (gain) of 34.16 dB (which directly translates to TRP) and the lowest EVM. An iterative tuning process can be performed to account for a poor EVM which would directly contribute to a low UL throughput. The radiated DL throughput can also be subject to comparison with a desired or ideal throughput resulting in a possible reduction of transmit power where extra head room in the link budget exists or resulting in actions taken to account for any in-band or out-band interference, such as antenna beam forming via amplitude and phase shifters to reduce the antenna gain towards the interference signal (e.g., applicable to both in-band and out-of-band) or an antenna matching with emphasis towards the working channel frequency to help reduce the interference signal more effectively for out-of-band and for the adjacent channels, depending on how the proximity of the adjacent channel interference signal.

Other configurations of FIG. 2 are possible for other types of cellular access technologies such as CDMA. These undisclosed configurations are contemplated by the subject disclosure.

Figure 3:
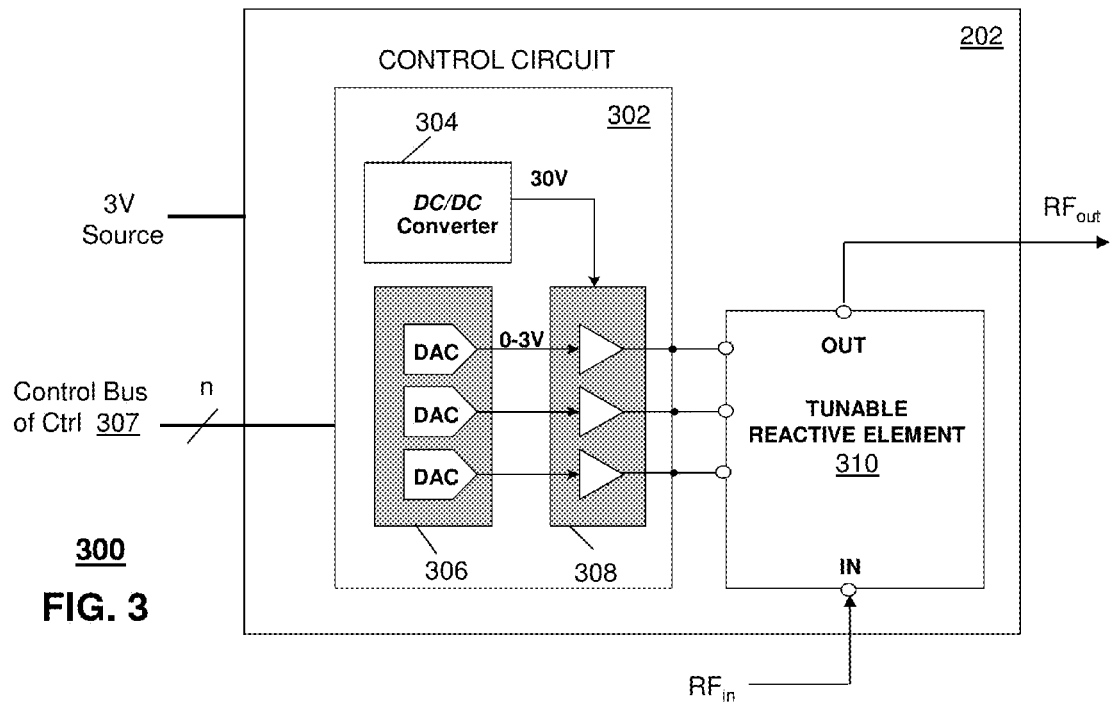
FIGS. 3-6 depict illustrative embodiments of a tunable matching network of the transceiver of FIG. 2.
Figure 4:
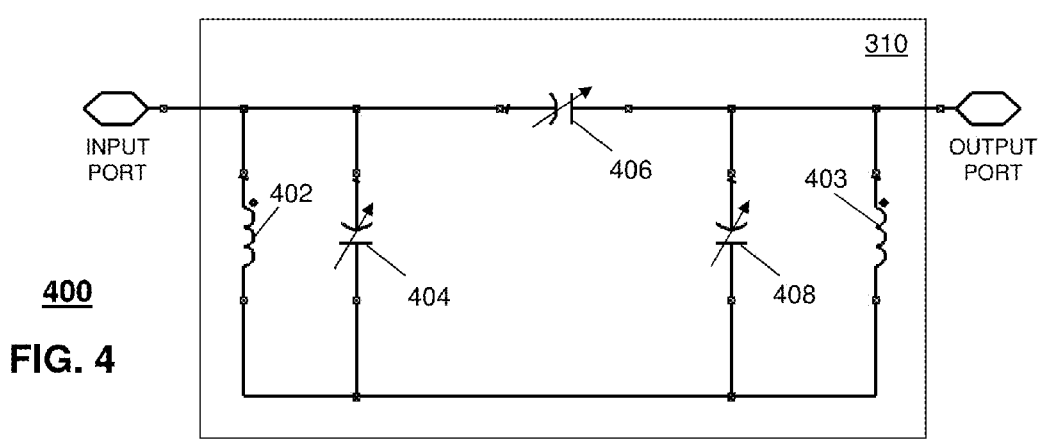

FIGS. 3-4 depict illustrative embodiments of the tunable matching network 202 of the transceiver 102 of FIG. 2. In one embodiment, the tunable matching network 202 can comprise a control circuit 302 and a tunable reactive element 310. The control circuit 302 can comprise a DC-to-DC converter 304, one or more digital to analog converters (DACs) 306 and one or more corresponding buffers 308 to amplify the voltage generated by each DAC. The amplified signal can be fed to one or more tunable reactive components 404, 406 and 408 such as shown in FIG. 4, which depicts a possible circuit configuration for the tunable reactive element 310. In this illustration, the tunable reactive element 310 includes three tunable capacitors 404-408 and two inductors 402-403 with a fixed inductance. Circuit configurations such as "Tee", "Pi", and "L" configurations for a matching circuit are also suitable configurations that can be used in the subject disclosure.

The tunable capacitors 404-408 can each utilize technology that enables tunability of the reactance of the component. One embodiment of the tunable capacitors 404-408 can utilize voltage or current tunable dielectric materials. The tunable dielectric materials can utilize, among other things, a composition of barium strontium titanate (BST). In another embodiment, the tunable reactive element 310 can utilize semiconductor varactors. Other present or next generation methods or material compositions that result in a voltage or current tunable reactive element are contemplated by the subject disclosure for use by the tunable reactive element 310 of FIG. 3.

The DC-to-DC converter 304 can receive a DC signal such as 3 volts from the power supply 114 of the communication device 100 in FIG. 1. The DC-to-DC converter 304 can use technology to amplify a DC signal to a higher range (e.g., 30 volts) such as shown. The controller 106 can supply digital signals to each of the DACs 306 by way of a control bus 307 of "n" or more wires to individually control the capacitance of tunable capacitors 404-408, thereby varying the collective reactive impedance of the tunable matching network 202, such as to achieve a desired parameter(s) including a desired UL and/or DL throughput. The control bus 307 can be implemented with a two-wire serial bus technology such as a Serial Peripheral Interface (SPI) bus (referred to herein as SPI bus 307). With an SPI bus 307, the controller 106 can transmit serialized digital signals to configure each DAC in FIG. 3. The control circuit 302 of FIG. 3 can utilize digital state machine logic to implement the SPI bus 307, which can direct digital signals supplied by the controller 106 to the DACs to control the analog output of each DAC, which is then amplified by buffers 308. In one embodiment, the control circuit 302 can be a stand-alone component coupled to the tunable reactive element 310. In another embodiment, the control circuit 302 can be integrated in whole or in part with another device such as the controller 106.

Although the tunable reactive element 310 is shown in a unidirectional fashion with an RF input and RF output, the RF signal direction is illustrative and can be interchanged. Additionally, either port of the tunable reactive element 310 can be connected to a feed point of the antenna 206, a radiating element of the antenna 206 in an on-antenna configuration, or between antennas for compensating cross-coupling when diversity antennas are used. The tunable reactive element 310 can also be connected to other circuit components of a transmitter or a receiver section such as filters, power amplifiers, and so on.

Figure 6:
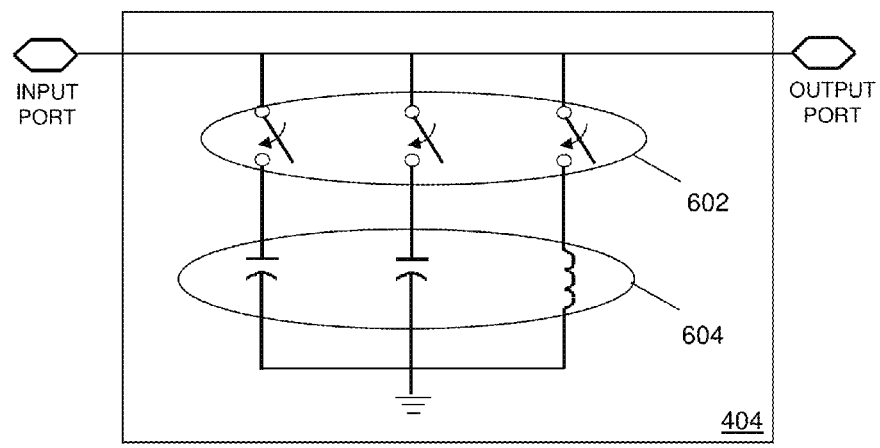

In another embodiment, the tunable matching network 202 of FIG. 2 can comprise a control circuit 502 in the form of a decoder and a tunable reactive element 504 comprising switchable reactive elements such as shown in FIG. 6. In this embodiment, the controller 106 can supply the control circuit 402 signals via the SPI bus 307, which can be decoded with Boolean or state machine logic to individually enable or disable the switching elements 602. The switching elements 602 can be implemented with semiconductor switches, micro-machined switches such as utilized in micro-electro-mechanical systems (MEMS), or other suitable switching technology. By independently enabling and disabling the reactive elements 607 (capacitor and/or inductor) of FIG. 6 with the switching elements 602, the collective reactive impedance of the tunable reactive element 504 can be varied by the controller 106.

Figure 5:
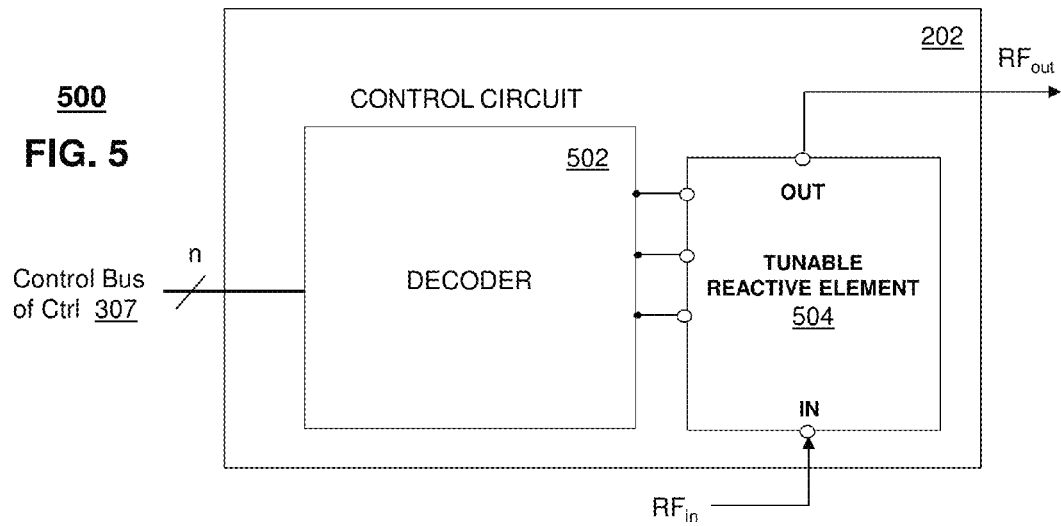

The tunable reactive elements 310 and 504 of FIGS. 3 and 5, respectively, can be used with various circuit components of the transceiver 102 to enable the controller 106 to manage performance factors such as, for example, but not limited to, transmit power, transmitter efficiency, receiver sensitivity, power consumption of the communication device 100, frequency band selectivity by adjusting filter passbands, linearity and efficiency of power amplifiers, specific absorption rate (SAR) requirements, radiated throughput, TRP, TIS, and so on.

Figure 8A:
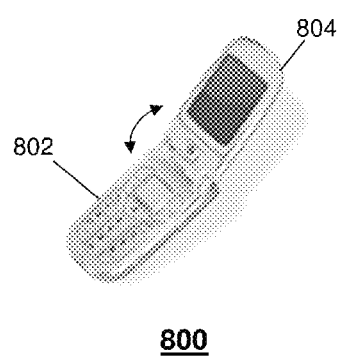

FIG. 7 depicts an illustration of a look-up table stored in memory, which can be indexed by the controller 106 of the communication device 100 of FIG. 1 according to physical and/or functional use cases of the communication device 100. A physical use case can represent a physical state of the communication device 100, while a functional use case can represent an operational state of the communication device 100. For example, for a flip phone 800 of FIG. 8a, an open flip can represent one physical use case, while a closed flip can represent another physical use case. In a closed flip state (i.e., bottom and top flips 802-804 are aligned), a user is likely to have his/her hands surrounding the top flip 802 and the bottom flip 804 while holding the phone 800, which can result in one range of load impedances experienced by an internal or retrievable antenna (not shown) of the phone 800. The range of load impedances of the internal or retrievable antenna can be determined by empirical analysis.

Figure 8B:
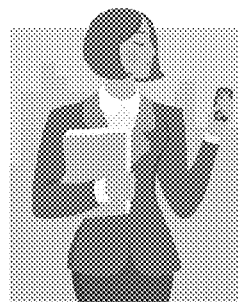
Figure 8C:
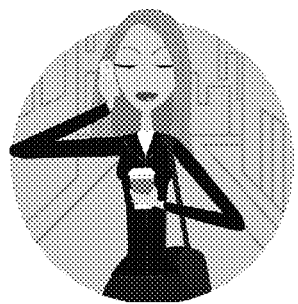
Figure 8D:
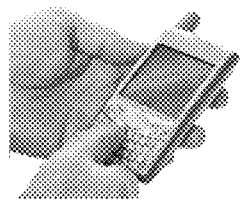
Figure 8E:
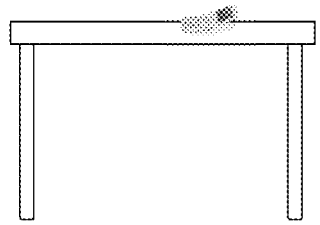

With the flip open a user is likely to hold the bottom flip 802 with one hand while positioning the top flip 804 near the user's ear when an audio system of the phone 800, such audio system 112 of FIG. 1, is set to low volume. If, on the other hand, the audio system 112 is in speakerphone mode, it is likely that the user is positioning the top flip 804 away from the user's ear. In these arrangements, different ranges of load impedances can be experienced by the internal or retrievable antenna, which can be analyzed empirically. The low and high volume states of the audio system 112 illustrate varying functional use cases. Other examples of use cases can include handheld operations such as shown by FIG. 8B, handheld and phone-to-head operations such as shown in FIG. 8C, handheld and typing operations as shown in FIG. 8D, and operations while on a metal table as shown in FIG. 8E. These are a few examples of use cases and more use cases can be utilized in the exemplary embodiments.

For a phone 900 with a slideable keypad 904 (illustrated in FIG. 9), the keypad in an outward position can present one range of load impedances of an internal antenna, while the keypad in a hidden position can present another range of load impedances, each of which can be analyzed empirically. For a smartphone 1000 (illustrated in FIG. 10) presenting a video game, an assumption can be made that the user is likely to hold the phone away from the user's ear in order to view the game. Placing the smartphone 1000 in a portrait position 1002 can represent one physical and operational use case, while utilizing the smartphone 1000 in a landscape position 1004 presents another physical and operational use case.

The number of hands and fingers used in the portrait mode may be determined by the particular type of game being played by the user. For example, a particular video game may require a user interface where a single finger in portrait mode is sufficient for controlling the game. In this scenario, it may be assumed that the user is holding the smartphone 1000 in one hand in portrait mode and using a finger with the other. By empirical analysis, a possible range of impedances of the internal antenna can be determined when using this video game in portrait mode. Similarly, if the video game selected has a user interface that is known to require two hands in landscape mode, another estimated range of impedances of the internal antenna can be determined empirically.

A multimode phone 1100 capable of facilitating multiple access technologies such as GSM, CDMA, LTE, WiFi, GPS, and/or Bluetooth in two or more combinations can provide additional insight into possible ranges of impedances experienced by two or more internal antennas of the multimode phone 1100. For example, a multimode phone 1100 that provides GPS services by processing signals received from a constellation of satellites 1102, 1104 can be empirically analyzed when other access technologies are also in use. Suppose, for instance, that while navigation services are enabled, the multimode phone 1100 is facilitating voice communications by exchanging wireless messages with a cellular base station 1106. In this state, an internal antenna of the GPS receiver may be affected by a use case of a user holding the multimode phone 1100 (e.g., near the user's ear or away from the user's ear). The affect on the GPS receiver antenna and the GSM antenna by the user's hand position can be empirically analyzed.

Suppose in another scenario that the antenna of a GSM transceiver is in close proximity to the antenna of a WiFi transceiver. Further assume that the GSM frequency band used to facilitate voice communications is near the operational frequency of the WiFi transceiver. Also assume that a use case for voice communications may result in certain physical states of the multimode phone 1100 (e.g., slider out), which can result in a probable hand position of the user of the multimode phone 1100. Such a physical and functional use case can affect the impedance range of the antenna of the WiFi transceiver as well as the antenna of the GSM transceiver.

A close proximity between the WiFi and GSM antennas and the near operational frequency of the antennas may also result in cross-coupling between the antennas, thereby changing the load impedance of each of the antennas. Cross-coupling under these circumstances can be measured empirically. Similarly, empirical measurements of the impedances of other internal antennas can be measured for particular physical and functional use configurations when utilizing Bluetooth, WiFi, Zigbee, or other access technologies in peer-to-peer communications with another communication device 1108 or with a wireless access point 1110.

The number of physical and functional use cases of a communication device 100 can be substantial when accounting for combinations of access technologies, frequency bands, antennas of multiple access technologies, antennas configured for diversity designs such as multiple-input and multiple output (MIMO) antennas, and so on. These combinations, however, can be empirically analyzed to load impedances and affects on other tunable circuits. The empirical data collected can be recorded in the look-up table of FIG. 7 and indexed according to corresponding combinations of physical and functional use cases. The information stored in the look-up table can be used in open-loop RF tuning applications to initialize tunable circuit components of a transceiver, as well as, tuning algorithms that control operational aspects of the tunable circuit components.

The empirical data of the look-up table of FIG. 7 can be based on desired TRP and/or TIS, which can be indexed based on use cases. In this example, the empirical data can be obtained through chamber testing under various conditions, including under various use cases. In another embodiment, the empirical data can be indexed (in combination with, or in place of, the use cases) based on other factors including operating frequency, device mode of operation, device operating metrics, and so forth. In another embodiment, the empirical data of the look-up table of FIG. 7 can be based on desired UL and/or DL throughput, which can be indexed based on use cases. In this embodiment, the empirical data can be indexed (in combination with, or in place of, the use cases) based on other factors including operating frequency, device mode of operation, device operating metrics, and so forth.

Figure 12A:
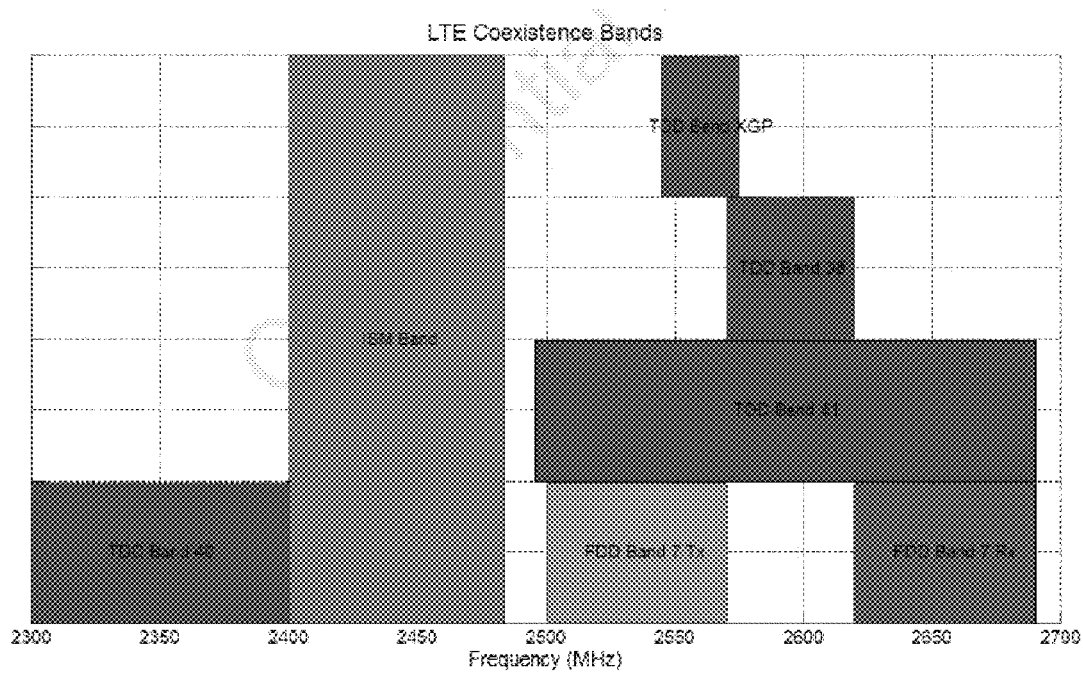
FIG. 12A depicts a graphical representation of frequency ranges for various coexistence bands.
Figure 12B:
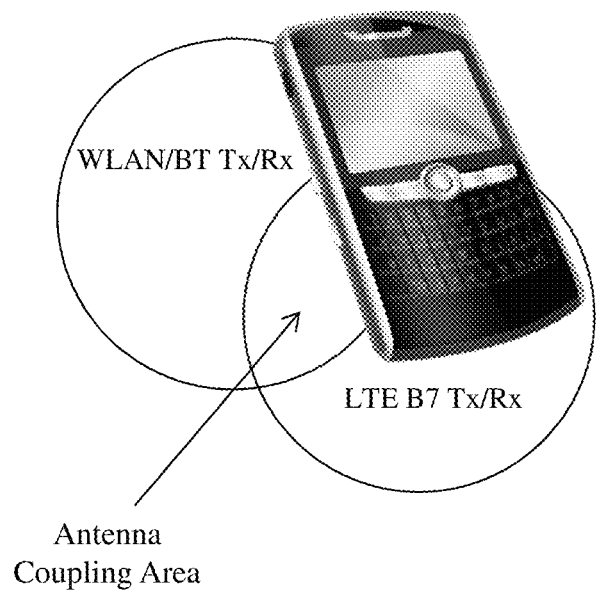
FIG. 12B depicts a schematic representation of antenna patterns with high antenna coupling.
Figure 12C:
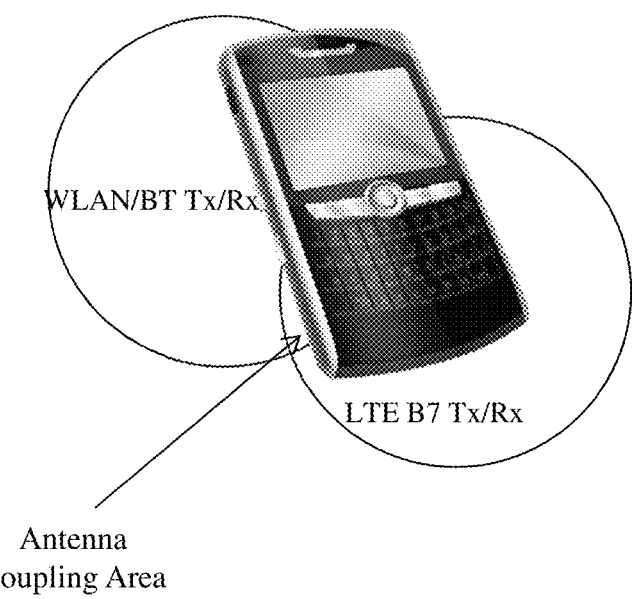
FIG. 12C depicts a schematic representation of antenna patterns with lower antenna coupling and improved antenna isolation due to selective beam forming.

Referring to FIG. 12A, coexistence bands are depicted for mobile communication devices. As is illustrated, very high out-of-band insertion loss, for example, may be required for a Band Pass Filter (BPF) of 2.4 GHz WLAN Rx (2402-2483 MHz) operation, where the first channel of LTE B7 Tx (2500-2570 MHz) is less than 20 MHz. These coexistence bands can lead to issues with radiated radio performance because of internal interference or self de-sense due to limited antenna isolation on a handheld wireless device, such as W-CDMA Rx Band 1 (2110-2170 MHz), Rx Band 4 (2110-2155), LTE Rx Band 7 (2620-2690 MHz) de-sensed by WLAN Tx (2402-2483 MHz), as well as WLAN 11b/g Rx (2402-2483 MHz) de-sensed by LTE Tx B7 (2500-2570 MHz). FIG. 12B illustrates antenna coupling occurring between WLAN/BT and LTE B7 operation, where minimum antenna isolation is of about 15 dB. In this example, the LTE B7 Tx can cause significant degradation of 2.4 GHz WLAN Rx sensitivity (over 20 dB) due to the fact that 2.4 GHz WLAN Rx last channel #13 (2462-2482 MHz) is less than 20 MHz away from the $1^{st}$ channel of LTE B7 Tx (2500-2520 MHz) (as shown in FIG. 12A) and the LTE Tx power is about 23 dBm. The exemplary embodiments enable Antenna beam forming to be applied by the device in order to reduce antenna coupling and improve antenna isolation, as illustrated in FIG. 12C, which has a smaller antenna coupling area than the device of FIG. 12B.

Figure 13A:
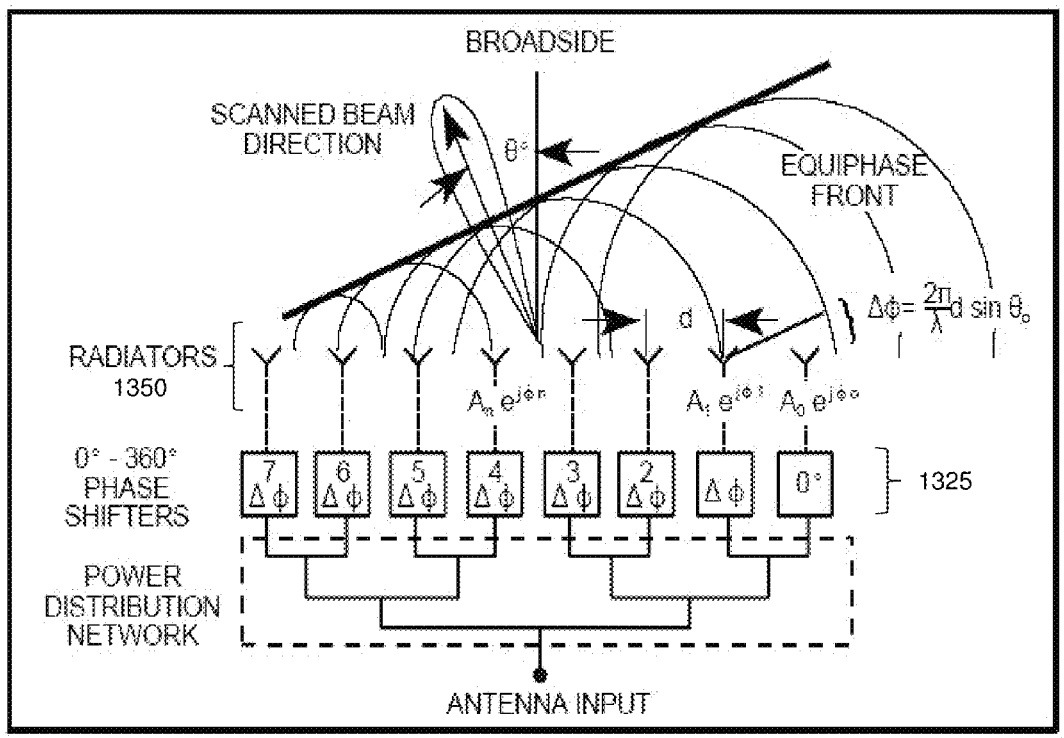
FIG. 13A depicts a schematic representation of an antenna array that can provide beam forming through use of phase shifters.
Figure 13B:
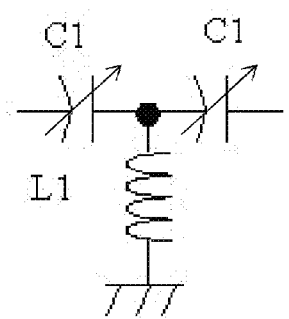
FIGS. 13B-E depict exemplary phase shifter configurations that can be used with the antenna array of FIG. 13A.
Figure 13C:
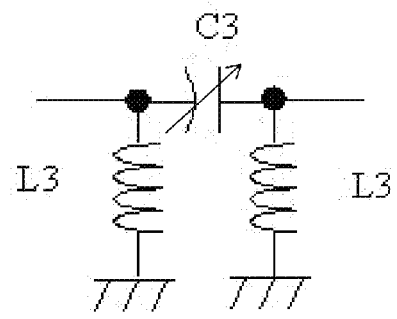
Figure 13D:
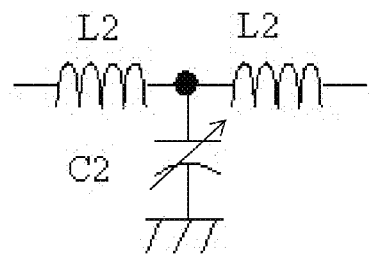
Figure 13E:
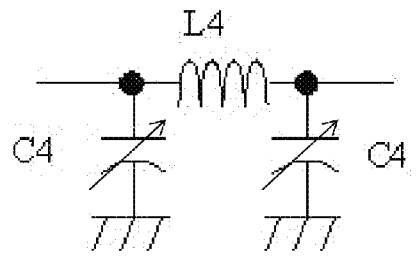

In one or more exemplary embodiments, antenna beam forming can be performed through use of amplitude and/or phase shifters to reduce the antenna gain towards the interference signal. This technique can be applied to either or both of outside interference and inside interference (self de-sense). As an example illustrated in FIG. 13A, an antenna array 1300 can include a plurality of phase shifters 1325 that are each coupled with radiating elements 1350 of the antenna. In this example, each radiating element 1350 is connected with a single phase shifter 1325 for performing beam forming to obtain a desired antenna pattern. However, the exemplary embodiments can utilize various configurations for generating desired antenna patterns that are utilized for reducing antenna coupling. Control signal can be provided to the phase shifters 1325 to control the amplitude and/or phase, such that antenna beam forming and antenna isolation is utilized for improving inside interference (self de-sense) between radios in the mobile handheld device. The antenna array 1300 can be utilized to provide the selected antenna pattern for reducing antenna coupling in conjunction with improving radiated system performance, such as through increasing throughput.

In one or more embodiments, tunable reactive elements, such as voltage tunable dielectric capacitors, can be utilized to adjust antenna matching circuits, so that the magnitude and phase of the matching circuits can be selectively changed to allow a first antenna (Tx/Rx) (e.g., a main antenna) and second antenna (Rx) (e.g., auxiliary antenna) forming an antenna array to create a desired antenna pattern, which can reduce the antenna coupling from an interfering radio antenna and avoid receiving interference signal from it. In other embodiments, the amplitude and/or phase shifters can be a sub-circuit coupled with the matching network and the antenna(s) for creating the desired antenna pattern through beam forming. One or more embodiments of selective antenna pattern generation to reduce antenna coupling can be applied for various antenna configurations, such as diversity antenna systems, Multiple-Input and Multiple-Output (MIMO) antenna systems, and so forth.

In one or more embodiments, various types of phase shifters can be utilized in performing the beam forming. For example, FIGS. 13B-E illustrate high pass tee, high pass pi, low pass tee and low pass pi configurations that can be utilized for phase shifting to attain a desired change in the phase by a selected degree. The variable capacitors depicted in FIGS. 13B-E can be voltage tunable dielectric capacitor, such as BST variable capacitors, or can be other types of tunable reactive elements, including semiconductor varactors, MEMS varactors, semiconductor switched capacitors, and/or MEMS switched capacitors. The particular number and configuration of components utilized to provide the tunable reactive elements for the phase shifters can vary and can include combinations of the components described above. By tuning the capacitor(s) in any of the circuits of FIGS. 13B-E, the phase of an RF signal passing through each circuit can be changed by desired degrees (+/−).

FIGS. 13B-E represent exemplary phase shifters that can be utilized in the embodiments described herein. The exemplary embodiments can utilize other discrete, distributed, and combinations of discrete/distributed implementations to perform phase shifting to enable beam forming to achieve a desired pattern and avoid or otherwise reduce antenna coupling.

Figure 14:
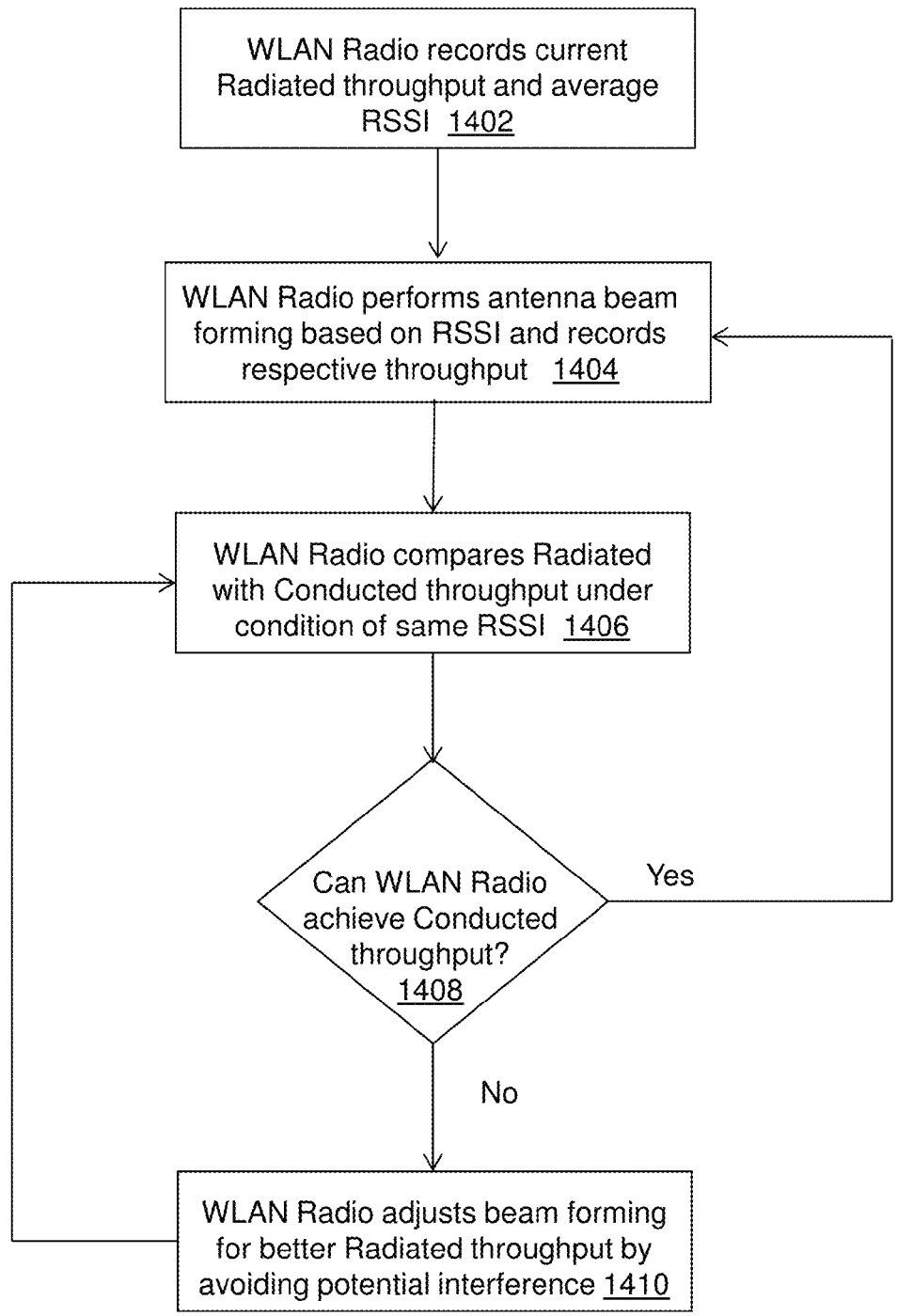
FIG. 14 depicts an exemplary method that can be used for antenna beam forming based on WLAN coexistence performance with and/or without the presence of external interferences.

FIG. 14 depicts an illustrative method 1400 that operates in conjunction with portions of the devices of FIGS. 1-13E. Method 1400 can be utilized for antenna beam forming in order to achieve a best or improved radio (e.g., WLAN) coexistence performance (e.g., throughput) with and/or without the presence of external interferences (known and/or unknown). As explained later herein, method 1400 can be used alone or in conjunction with other performance improving techniques, such as tuning algorithms that tune based on improving throughput and/or reducing transmission power.

Method 1400 can begin at 1402 where a WLAN radio of the communication device obtains and stores performance data, such as current radiated throughput and/or average RSSI data. At 1404, the WLAN radio can perform beam forming based on RSSI data and can store throughput data collected during the beam forming, which corresponds to the respective RSSI data. At 1406, the WLAN radio can compare radiated throughput with a conducted throughput (e.g., a throughput threshold) under the condition of the same RSSI.

At 1408, it can be determined whether the WLAN radio can achieve the conducted throughput or otherwise is able to satisfy a desired throughput threshold. If the threshold can be achieved then method 1400 can repeat itself. If on the other hand, it is determined or otherwise estimated that the WLAN radio will not be able to satisfy the threshold, then the WLAN radio at 1410 can adjust the beam forming to improve the radiated throughput by avoiding potential interference, such as antenna coupling. The adjustment to the beam forming based on throughput and reducing antenna coupling (or improving antenna isolation) can be an iterative process utilizing phase shifters and pre-determined or dynamic phase steps. The adjustment to the beam forming can be performed utilizing various components, including the antenna array and phase shifters of FIGS. 13A-E.

In one or more embodiments, use cases can be utilized as part of method 1400, including utilizing use cases to determine step sizes for beam forming and/or tuning. In other embodiments, beam forming can be separately applied for different communications protocols, such as LTE and WLAN, and the order of performing the beam forming can be based on a number of different factors, including a current use case. Other factors, such as RSSI data, throughput measurements, base station instructions (e.g., to reduce power) can also be utilized as part of the beam forming.

In one or more exemplary embodiments, adjustable reactive elements can be utilized for altering antenna patterns for selected antenna(s) without altering patterns for other antenna(s). As an example, adjustable reactive elements (e.g., voltage tunable dielectric capacitors) can be coupled with a main antenna matching circuit and its associated structure of tunable area, tunable shape, and tunable coupling factor to the main ground. Control of the adjustable reactive elements can enable adjusting the main antenna (such as an LTE B7 antenna) pattern without the involvement of the auxiliary antenna, resulting in a reduction of the coupling to another antenna (such as 2.4 GHz WLAN antenna). In this example, the LTE B7 Tx signal would provide less interference to the WLAN receiver.

Figure 15:
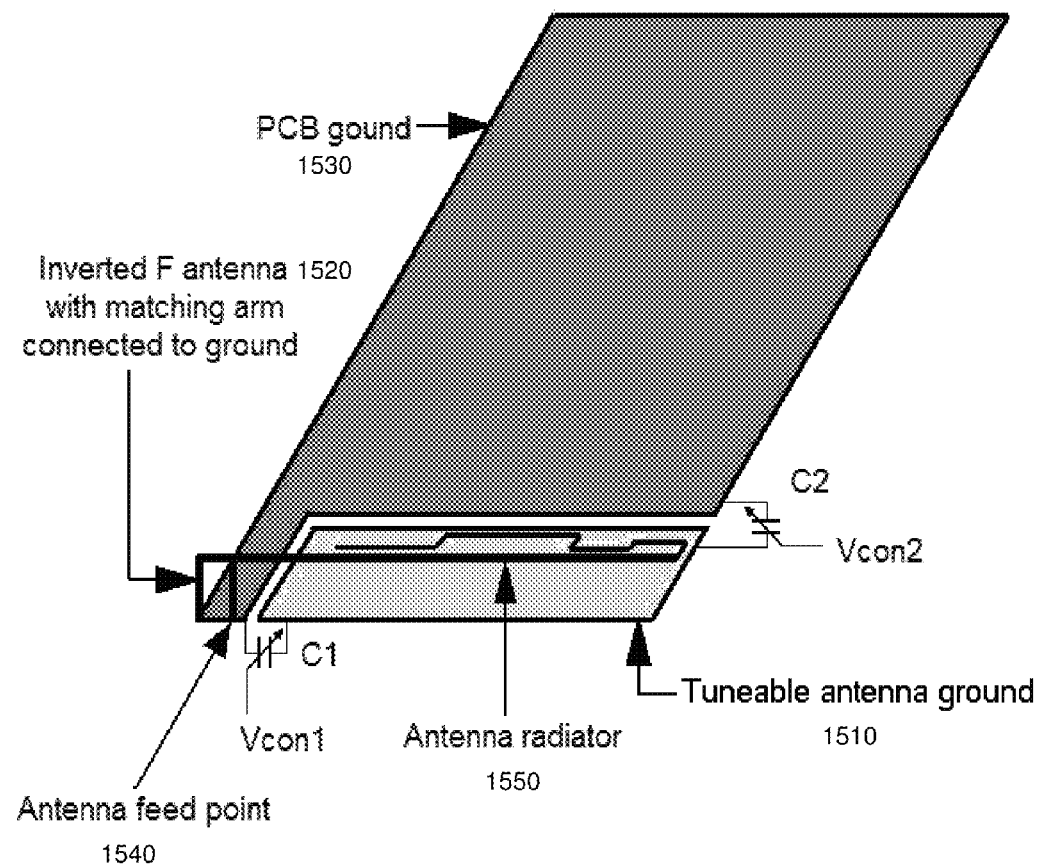
FIG. 15 depicts a schematic representation of an antenna with tunable ground plane to enable adjusting of an antenna pattern and/or radiation direction.

In one exemplary embodiment illustrated in FIG. 15 which can be used for adjusting an antenna pattern for one antenna without adjusting an antenna pattern for another antenna as described above, an antenna 1500 has a tuneble ground plane 1510 that enables the change of the antenna pattern and radiation direction, where the tunable ground is realized by either adjustable reactive elements C1 or C2, or both C1 and C2. In this example, elements C1 and C2 can be various types of adjustable reactive elements, including voltage tunable dielectric capacitors, with high linearity and a selected tuning range (e.g., 3:1). The use of antenna 1500 can gain not only better link between a mobile and base station (which translates to better throughput and/or coverage), but also can achieve better antenna isolation to reduce the interference to or from other radios and provide better radio performance (e.g., throughput and/or coverage). Antenna 1500 can include an inverted F antenna 1520 with matching arm connected to a PCB ground 1530 and an antenna feed point 1540. An antenna radiator 1550 can be disposed on the tunable antenna ground 1510. The reactive elements C1 and C2 can be connected between the tunable antenna ground 1510 and the PCB ground 1520 to enable generating the desired antenna pattern for the antenna 1500.

The exemplary embodiments can be applied to various communication protocols, such as GSM/CDMA/WCDMA/LTE and RF connectivity, to improve performance, such as through improving throughput and reducing antenna coupling. In one or more embodiments, the adjustable beam forming described herein can be applied to non-RF circuits, such as LCD, touch panel, speakers, audio receivers, cameras, flex cables, and others which emit analog and/or digital noise, harmonics of clocks, etc. Through dynamically forming the antenna radiation patterns, providing better antenna isolation, and making optimal trade-off between coexistence radio system performances, one or more of the exemplary embodiments can improve OTA throughput for the respective radio systems.

Figure 17:
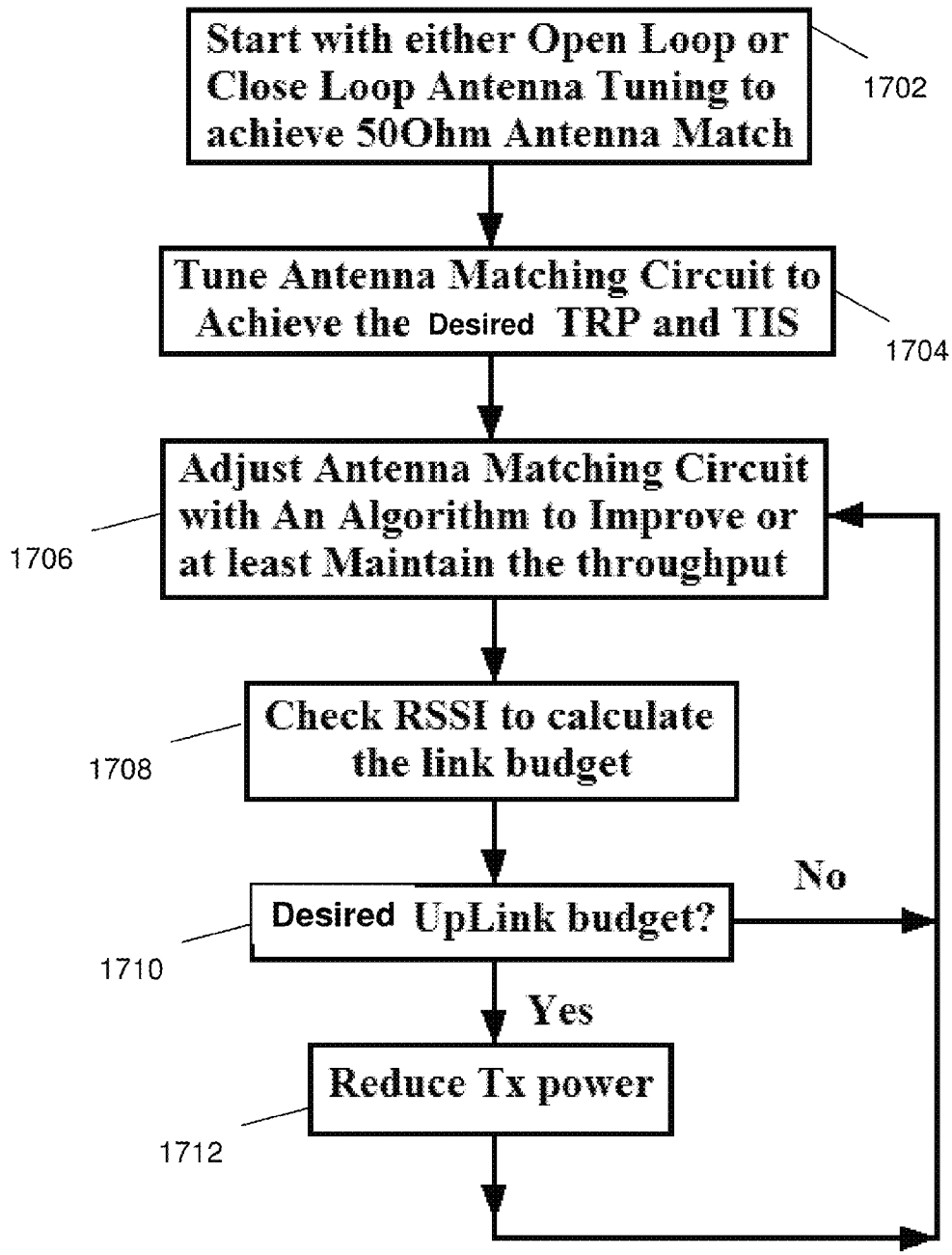
FIG. 17 depicts an exemplary method that can be used for tuning of a communication device and/or managing of power consumption.

FIG. 17 depicts an illustrative method 1700 that operates in conjunction with portions of the devices and/or methods of FIGS. 1-15. In addition to, or in place of, achieving a better pre-determined antenna match (e.g., 50Ω) for each radio Tx/Rx band and/or in addition to, or in place of, achieving better TRP/TIS in various use cases (e.g., free space, handheld, and other limited modes of operation), method 1700 can conduct antenna tuning for each radio Tx/Rx band with the goal of achieving a better or best QoS with a lower or lowest power consumption. In order to achieve this goal, a dynamic antenna tuning and radio system control is implemented with the target of achieving a better or best throughput as a quantitative measure of QoS.

Method 1700 can begin at 1702 in which tuning is performed to achieve or otherwise tune toward a pre-determined match, such as a 50Ω match. The tuning can be performed across operating Tx and Rx bands. The particular tuning algorithm employed can vary and can include an open-loop process and/or a closed-loop process.

At 1704, tuning can be performed based on TRP and TIS. In one embodiment, the tuning is performed to improve the TRP and TIS, and utilizes stored tuning data (e.g., stored in a look-up table of the memory of the communication device) that is indexed based on use cases. For instance, the communication device can determine that it is in a hands-free operation state and can retrieve tuning data for the hands-free operation state that enables improvement of the TRP and improvement of the TIS depending on the Tx or Rx mode of operation. The tuning data can be utilized in the adjustment of the tunable reactive elements of the matching network, such as elements 310 or 504 of FIGS. 3 and 5, respectively. The tuning data can be adjustment values to be utilized for the adjustable reactive element (e.g., a particular bias voltage) and/or can be information from which such adjustments values can be derived or otherwise determined.

At 1706, throughput can be utilized for tuning of the matching network to improve or maintain a desired UL or DL throughput for the communication device. At 1708, the link budget can be calculated, such as through determining received signal strength indicator, transmit power and antenna gain. Based on an analysis of the link budget at 1710, method 1700 can either proceed to 1712 for adjusting the transmit power (e.g. reducing the transmit power) or return to 1706 for tuning the matching network in an effort to improve or maintain the radiated throughput.

For example, radiated UL throughput can be compared with a desired UL throughput (e.g., a throughput threshold), such as through use of RSSI measurement, to determine whether tuning is to be performed to improve or maintain the radiated UL throughput. If tuning is to be utilized (e.g., the UL throughput is outside of a desired range) then an iterative process can be employed whereby the matching network is adjusted and the UL throughput is again compared with the throughput threshold to drive the UL throughput toward a desired value Improvement of the UL throughput can be achieved by presenting the load impedance to a Tx power amplifier, which would provide better trade-off between TRP and EVM. If on the other hand, the UL throughput is in a desired range, then an iterative process can be employed whereby the transmit power is adjusted (e.g. reduced in incremental steps) and the UL throughput is again compared with the throughput threshold to maintain the UL throughput in the desired range. The incremental step sizes that are utilized for the transmit power reduction can be pre-determined or can be dynamic.

Continuing with this example, radiated DL throughput can be compared with a throughput threshold, such as through use of RSSI measurement, to determine whether a reduction of transmit power can be performed. If the DL throughput is in a desired range, then an iterative process can be employed whereby the transmit power is adjusted (e.g., reduced in incremental steps) based on extra head room in the link budget. The incremental step sizes that are utilized for the transmit power reduction can be pre-determined or can be dynamic. If on the other hand, the DL throughput is not in a desired range then a determination can be made as to whether in-band and/or out-band interference exists. If it is determined that such interference exists then the communication device can perform antenna beam forming (e.g., via amplitude and phase shifters) to reduce the antenna gain towards the interference signal (e.g., applicable to both in-band and out-of-band interference) and/or can perform antenna matching with an emphasis towards the working channel frequency to reduce the interference signal more effectively for out-of-band, as well as for the adjacent channels, depending on the proximity of the adjacent channel interference signal, such as described with respect to FIGS. 12A-15 and method 1400.

In one embodiment, a closed-loop antenna tuning process can be initially performed such as at 1702, where the antenna matching circuit is tuned towards a pre-determined match (e.g., 50Ω) across operating Tx and Rx bands. The closed-loop tuning can utilize feedback from one or more detectors, where the feedback provides operating metric(s) of the communication device, including one or more of RF voltage, output power, return loss, received power, current drain, transmitter linearity, and Voltage Standing Wave Ratio data. The operating metric(s) can be used to determine the desired adjustment to the matching network, such as through an iterative process that tunes and that retrieves the feedback. The particular type of detector utilized for obtaining the feedback can vary and can include one or more directional couplers. The detector(s) can be positioned in various configurations in the communication device, including one or more of connected between the antenna and a transceiver; connected between the antenna and the matching network (with or without a detector connected between the matching network and the transceiver); and connected between the matching network and the transceiver (with or without a detector connected in proximity to the antenna (e.g., between the antenna and the matching network)). The feedback can be obtained at various times during the communication session, including during transmission by the transceiver.

In one embodiment, a closed-loop tuning process (e.g., at step 1704 of method 1700) can be utilized to achieve better or best TRP and/or TIS in each pre-defined use case (e.g., free space, handheld, handheld close to head, on-a-metal table, hands-free, speaker-phone operations, flip opened, slider out, etc.). In this example, the closed-loop tuning process can have an advantage over an open-loop process (that does not utilize feedback) in Tx mode, because the closed-loop process knows (through proper calibration) what load impedance the antenna would present to the PA output. In one embodiment, closed-loop tuning can be calibrated under each pre-defined use case (e.g., via empirical data gathered during chamber testing), where the calibration goal may not be the better or best TRP and TIS, but rather the better or best UL and DL throughputs. In this example, further tuning improvement or optimization can be utilized during real life radiated usage cases, where additional fine tuning based on steps 1706-1712 of method 1700 can be used to adapt the real environment for the better or best UL and DL throughputs.

Continuing with this example, a closed-loop tuning process during Rx mode (e.g., when the Rx band is different from Tx band) may not know the impedance that the antenna will present to the low noise amplifier of the communication device. The impedance presented to the low noise amplifier can be known via calibration in each pre-defined use case for the best TIS in an open-loop tuning process. But, a closed-loop tuning process may not dynamically provide the best TIS in the real life usages. In one embodiment, by changing the performance goal from TIS to DL throughput, an algorithm can be utilized to dynamically control the closed-loop tuning for the better or best DL throughput. In one embodiment, the tuning algorithm may start from the best or desired TIS in each pre-defined user case (derived from empirical data during chamber testing). In another embodiment, when in-band or out-of-band interference occurs or is detected, the closed-loop tuning process can adopt the similar method as the open-loop tuning process to overcome the interference with the goal of the best or better throughput.

The different tuning processes of the exemplary embodiments can be utilized together or can be utilized separately, and can include combining steps or features from one embodiment with steps or features from another embodiment. One or more of the exemplary embodiments can employ antenna tuning towards a 50Ω match across several and fairly wide Tx and Rx radio bands. One or more of these exemplary embodiments can also employ antenna tuning to optimize, improve or otherwise adjust TRP and/or TIS with known steady state use cases based on information from various sensors. One or more of the exemplary embodiments can employ dynamic antenna tuning towards the 50Ω match with a closed-loop tuning process. One or more of the exemplary embodiments can employ antenna tuning to achieve better TRP and/or TIS without utilizing tuning toward a 50Ω match via calibration and empirical data stored in look-up tables.

One or more of the exemplary embodiments can take into account that an optimized TRP and/or TIS may not provide the best user experience. In one or more embodiments, the best user experience can be defined by quality of service parameters, such as voice quality and/or data throughput. QoS is not directly proportional or otherwise 100% related to TRP and TIS, which are just two variables of QoS function.

Figure 18:
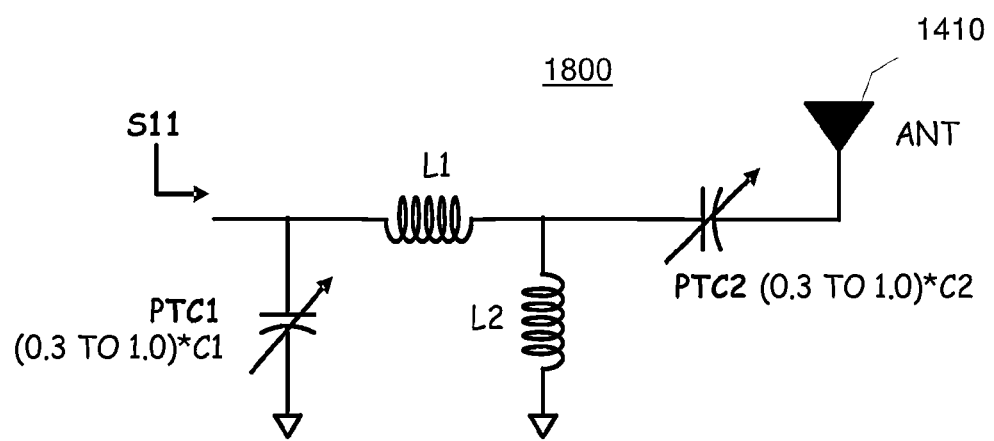
FIG. 18 depicts an illustrative embodiment of a matching circuit that can be used for antenna tuning.

Referring to FIG. 18, an exemplary matching circuit 1800 is illustrated that can be used in tuning in method 1700, such as at step 1702. Additional tuning processes and components are described in U.S. Patent Publication No. 20090121963 to Greene, the disclosure of which is hereby incorporated by reference. The illustrated matching circuit 1800 includes a first tunable capacitance PTC1, a first impedance L1, a second impedance L2 and a second tunable capacitance PTC2. A PTC is a tunable capacitor with a variable dielectric constant that can be controlled by a tuning algorithm, such as via the control circuit 302 of FIG. 3. The first tunable capacitance PTC1 can be coupled to ground on one end and to the output of a transceiver on the other end. The node of PTC1 that is coupled to the transceiver is also connected to a first end of the first impedance L1. The second impedance L2 is connected between the second end of the first impedance L1 and ground. The second end of the first impedance L1 is also coupled to a first end of the second tunable capacitance PTC2. The second end of the second tunable capacitance PTC2 is then coupled to an antenna 1710.

The tunable capacitances can be tuned over a range such as, for example, 0.3 to 1 times a nominal value C. For instance, if the nominal value of the tunable capacitance is 5 pF, the tunable range can be from 1.5 to 5 pF. In an exemplary embodiment, PTC1 can have a nominal capacitance of 5 pF and is tunable over the 0.3 to 1 times range, the first impedance L1 can have a value of 3.1 nH, and the second impedance L2 can have a value of 2.4 nH and the second tunable capacitance PTC2 can have a nominal value of 20 pF and can be tuned over a range of 0.3 to 1 times the nominal value. It should be understood that these values are exemplary and other ranges of values can also be employed. It will be appreciated that the tunable capacitances in the illustrated embodiment could be tuned or adjusted over their ranges in an effort to improve the matching characteristics of the antenna 1810 under various operating conditions. Thus, under various use conditions, operating environments and at various frequencies of operation, the tunable capacitances can be adjusted to attain a desired level of performance. The tuning goals can vary and can include tuning toward a pre-determined match (e.g., 50Ω match), tuning toward a desired UL and/or DL throughput, and so forth.

Figure 19:
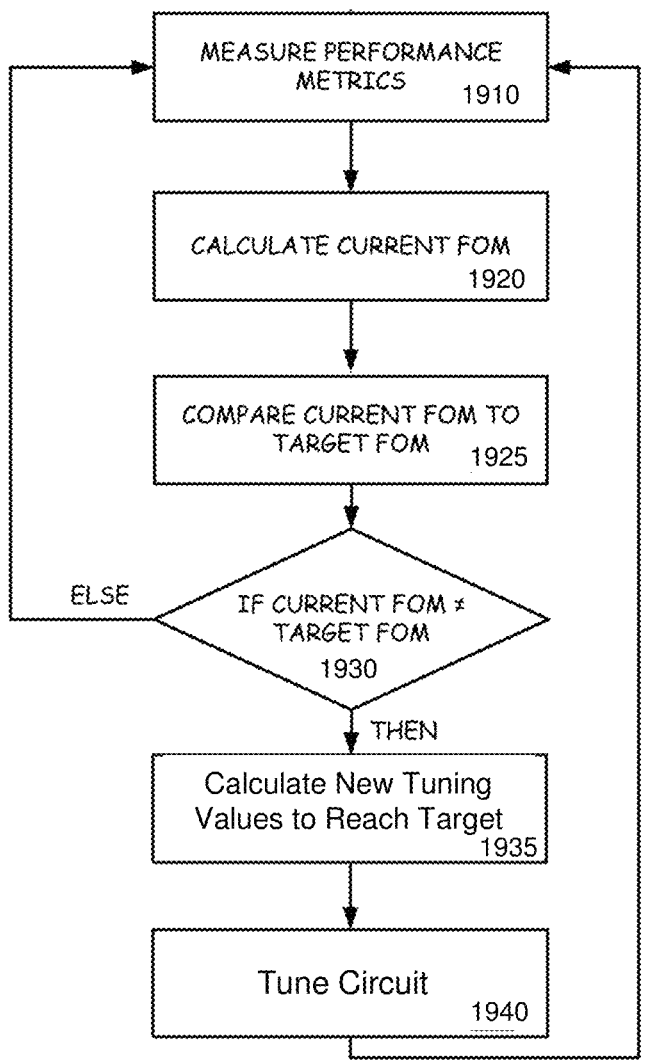
FIG. 19 depicts an exemplary method that can be used for tuning of a communication device.

Referring additionally to FIG. 19, a flow diagram is provided that illustrates a tuning process based on a Figure of Merit that can be used in conjunction with method 1700. This tuning process can be one or more of the tuning steps or layers of method 1700 or can be a combination of tuning steps or layers. At 1910, performance parameters or metrics can be measured and used as feedback. The performance metrics utilized may vary over various usage scenarios, over modulation being utilized (e.g., Frequency Division Multiplexing or FDM, Time Division Multiplexing or TDM, etc.), based on system settings and/or carrier requirements, etc. For instance, in an illustrative embodiment, the performance metrics can include one or more of RSSI, transmitter return loss, output power, current drain, and/or transmitter linearity. A current figure of merit (FOM) can be calculated at 1920 from the performance metrics, as well as other criteria. The current FOM can then be compared to a target FOM at 1925. The target FOM can be the optimal or desired performance requirements or objective. In one embodiment, the target FOM can be defined by a weighted combination of any measurable or predictable metrics.

Thus, depending on the goal or objective, the target FOM can be defined to tune the matching network to achieve particular goals or objectives. As a non-limiting example, the objectives may focus on TRP, TIS, UL throughput, DL throughput, and so forth. Furthermore, the target FOM may be significantly different for a TDM system and an FDM system. It should be understood that the target FOM may be calculated or selected based on various operating conditions, prior measurements, and modes of operation.

New tuning values can be calculated or selected at 1935 when the current FOM is not equal to or within a desired range of the target FOM. In some embodiments, new tuning values may be stored as new default tuning values of the transmitter at the given state of operation.

In one embodiment, the tuning algorithm can tune one or more of the tunable components of the circuit of FIG. 18 at step 1940, measure the new FOM (e.g., based on RSSI and radiated throughput) at steps 1920-1930, and re-adjust or retune the matching network accordingly in steps 1935-1940 in a continuous loop. This process can adapt a tunable circuit from a non-matched or undesired state towards a matched or desired state one step at a time. This process can be continued or repeated to attain and/or maintain performance at the target FOM. Thus, the process identified by steps 1910 through 1940 can be repeated periodically as needed, or otherwise. The looping illustrated in FIGS. 17 and 19 can be beneficial because even if performance at the target FOM is attained, adjustments may be necessary as the mode of operation (such as usage conditions) of the communication device changes and/or the performance of the transmitter, the antenna or the matching circuitry change over time. In one embodiment, power consumption management can include selectively reducing transmit power in accordance with step 1712 of method 1700 (while maintaining a desired radiated throughput) and selectively increasing transmit power when necessary or desirable based on other circumstances. The power consumption management process enables selectively increasing and reducing transmit power in accordance with quality of service goals and parameters.

In other embodiments, the tunable components can be set based on look-up tables or a combination of look-up tables and by performing fine-tuning adjustments. For instance, the step of calculating tuning values at step 1935 may involve accessing initial values from a look-up table and then, on subsequent loops, fine tuning the values of the components in the circuit of FIG. 18.

Figure 20:
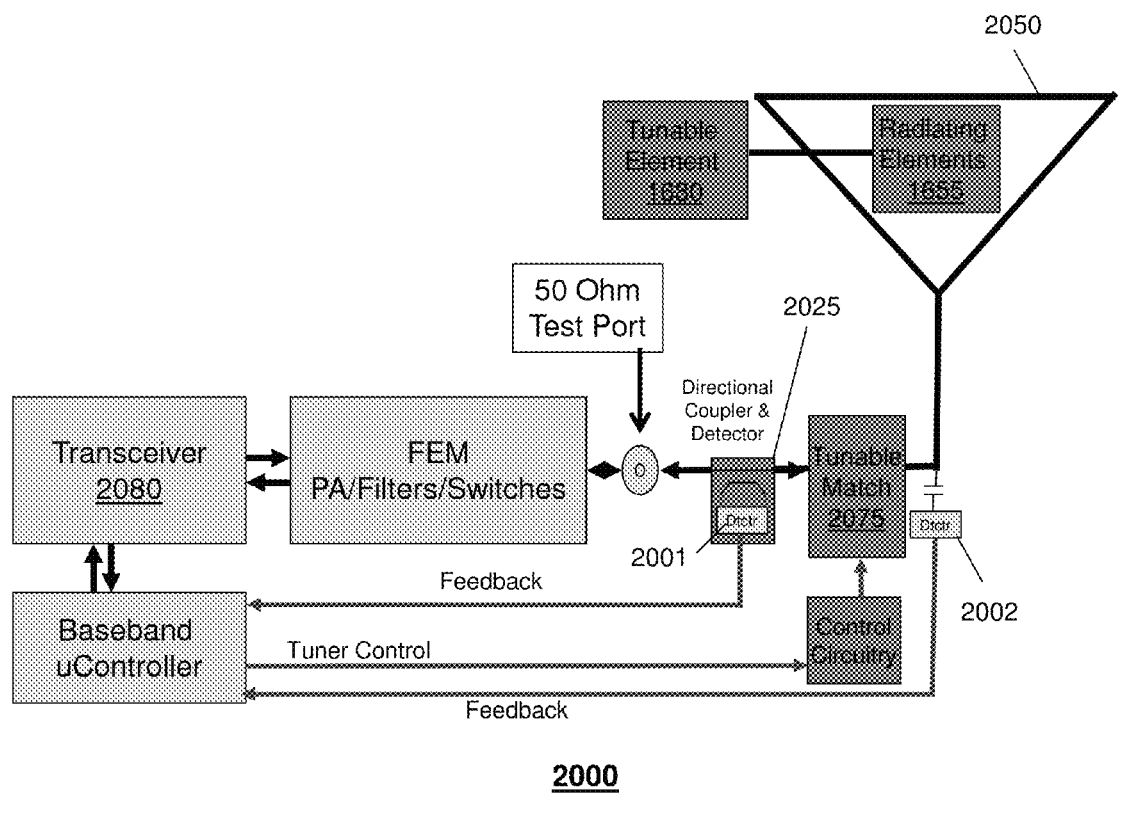
FIG. 20 depicts an illustrative embodiment of a portion of a communication device that can perform antenna tuning, beam forming and/or power consumption management.

FIG. 20 depicts an exemplary embodiment of a portion of a communication device 2000 (such as device 100 in FIG. 1) having a tunable matching network which can include, or otherwise be coupled with, a number of components such as a directional coupler, a sensor IC, control circuitry and/or a tuner. The tunable matching network can include various other components in addition to, or in place of, the components shown, including components described above with respect to FIGS. 1-6. In addition to the detector 2001 coupled to the directional coupler 2025, there is shown a detector 2002 coupled to the RF line feeding the antenna 2050. A tunable matching network 2075 can be coupled to the antenna 2050 and a transceiver 2080 (or transmitter and/or receiver) for facilitating communication of signals between the communication device 2000 and another device or system. In this exemplary embodiment, the tunable match can be adjusted using all or a portion of the detectors for feedback to the tuning algorithm.

Communication device 2000 can perform tuning and transmit power adjustment according to method 1700. For example, signals can be provided to the matching network 2075 to enable tuning towards a 50Ω match. Additional signals can be provided to the matching network 2075 to enable tuning based on TPR and TIS for an identified use case(s) for the communication device 2000. RSSI can be calculated based on data retrieved from one or more of the measuring devices 2001, 2002, 2025. The RSSI can be utilized to calculate the link budget for the communication device to determine whether the radiated throughput satisfies a throughput threshold (in which case transmit power reduction may be implemented) or whether the radiated throughput is outside of the desired range in which case additional tuning of the matching network 2075 toward the desired throughput can be performed.

Communication device 2000 can include one or more radiating elements 2055 of the antenna 2050. One or more tunable elements 2080 can be connected directly with one or more of the radiating elements 2055 to allow for tuning of the antenna 2050 in conjunction with or in place of tuning of the matching network 2075. The tunable elements 2080 can be of various types as described herein, including electrically tunable capacitors. The number and configuration of the tunable elements 2080 can be varied based on a number of factors, including whether the tuning is an open loop or a closed loop process. In one embodiment, all of the radiating elements 2055 has at least one tunable element 2080 connected thereto to allow for tuning of the radiating element. In another embodiment, only a portion of the radiating elements 2055 have a tunable element 2080 connected thereto. Like the matching network 2075, the tunable elements 2080 can be tuned based on a quality of service parameter, such as the radiating UL and DL throughputs.

In one or more embodiments, the antenna tuning and power consumption management described in the exemplary embodiments can be applied to multi-antenna systems, including systems that utilize main and auxiliary antennas and systems that use Multiple-In Multiple-Out (MIMO) configurations. The antenna tuning can be applied to select antennas of the multiple antenna system or can be applied to all of the antennas of the multiple antenna system. The multiple antenna systems can utilize matching networks, such as connected at a feedpoint of one or more of the antennas and/or can utilize on-antenna tuning with tunable elements directly connected to the antennas radiating elements.

Upon reviewing the aforementioned embodiments, it would be evident to an artisan with ordinary skill in the art that said embodiments can be modified, reduced, or enhanced without departing from the scope and spirit of the claims described below. For example, other information can be utilized for determining the throughput threshold, such as the modulation scheme being implemented at the communication device, signal strength, information received from a base station, the distance from the base station, and so forth.

The use cases can include a number of different states associated with the communication device, such as flip-open, flip-closed, slider-in, slider-out (e.g., Qwerty or numeric Keypad), speaker-phone on, speaker-phone off, hands-free operation, antenna up, antenna down, other communication modes on or off (e.g., Bluetooth/WiFi/GPS), particular frequency band, and/or transmit or receive mode. The use case can be based on object or surface proximity detection (e.g., a user's hand or a table). Other environmental effects can be included in the open loop process, such as temperature, pressure, velocity and/or altitude effects. The open loop process can take into account other information, such as associated with a particular location (e.g., in a building or in a city surrounded by buildings), as well as an indication of being out of range.

The exemplary embodiments can utilize combinations of open loop and closed loop processes, such as tuning a tunable element based on both a use case and a measured operating parameter (e.g., measured by a detector in proximity to the antenna and/or measured by a directional coupler between the matching network and the transceiver). In other examples, the tuning can utilize one process and then switch to another process, such as using closed loop tuning and then switching to open loop tuning based on particular factors associated with the communication device, including the UL and/or DL throughput.

In one embodiment, the tuning of the matching network(s) can be performed in combination with look-up tables where one or more desirable performance characteristics of a communication device 100 can be defined in the form of the FOMs. The communication device can be adapted to find a range of tuning states that achieve the desired FOMs by sweeping a mathematical model in fine increments to find global optimal performance with respect to the desired FOMs. In this example embodiment, the look-up table can be indexed (e.g., by the controller 106 of the communication device 100 of FIG. 1) during operation according to band and/or use case.

In one embodiment, the tuning algorithm can apply a translation to the tuning values of the matching network derived during the transmitter time slot, to improve performance during the receive time slot. During the design of the transmitter and receiver circuitry, the characteristics of performance between the transmitter operation and receiver operation can be characterized. This characterization can then be used to identify an appropriate translation to be applied. The translation may be selected as a single value that is applicable for all operational states and use cases or, individual values which can be determined for various operational states and use cases.

Other information (from local or remote sources) can also be utilized in one or more of the tuning steps, including use of profile information or other data received from a base station. Examples of other information and other tuning methodologies usable with the embodiments of the present disclosure are described in U.S. Patent Application Publication 20110086630 to Manssen, the disclosure of which is hereby incorporated by reference.

The exemplary embodiments can utilize on-antenna tuning elements (in addition to or in place of a matching network element), which can be directly connected with the radiating element(s), including high band (HB) and low band (LB) radiating elements and/or a portion of the radiating elements. Other embodiments are contemplated by the subject disclosure.

It should be understood that devices described in the exemplary embodiments can be in communication with each other via various wireless and/or wired methodologies. The methodologies can be links that are described as coupled, connected and so forth, which can include unidirectional and/or bidirectional communication over wireless paths and/or wired paths that utilize one or more of various protocols or methodologies, where the coupling and/or connection can be direct (e.g., no intervening processing device) and/or indirect (e.g., an intermediary processing device such as a router).

Figure 21:
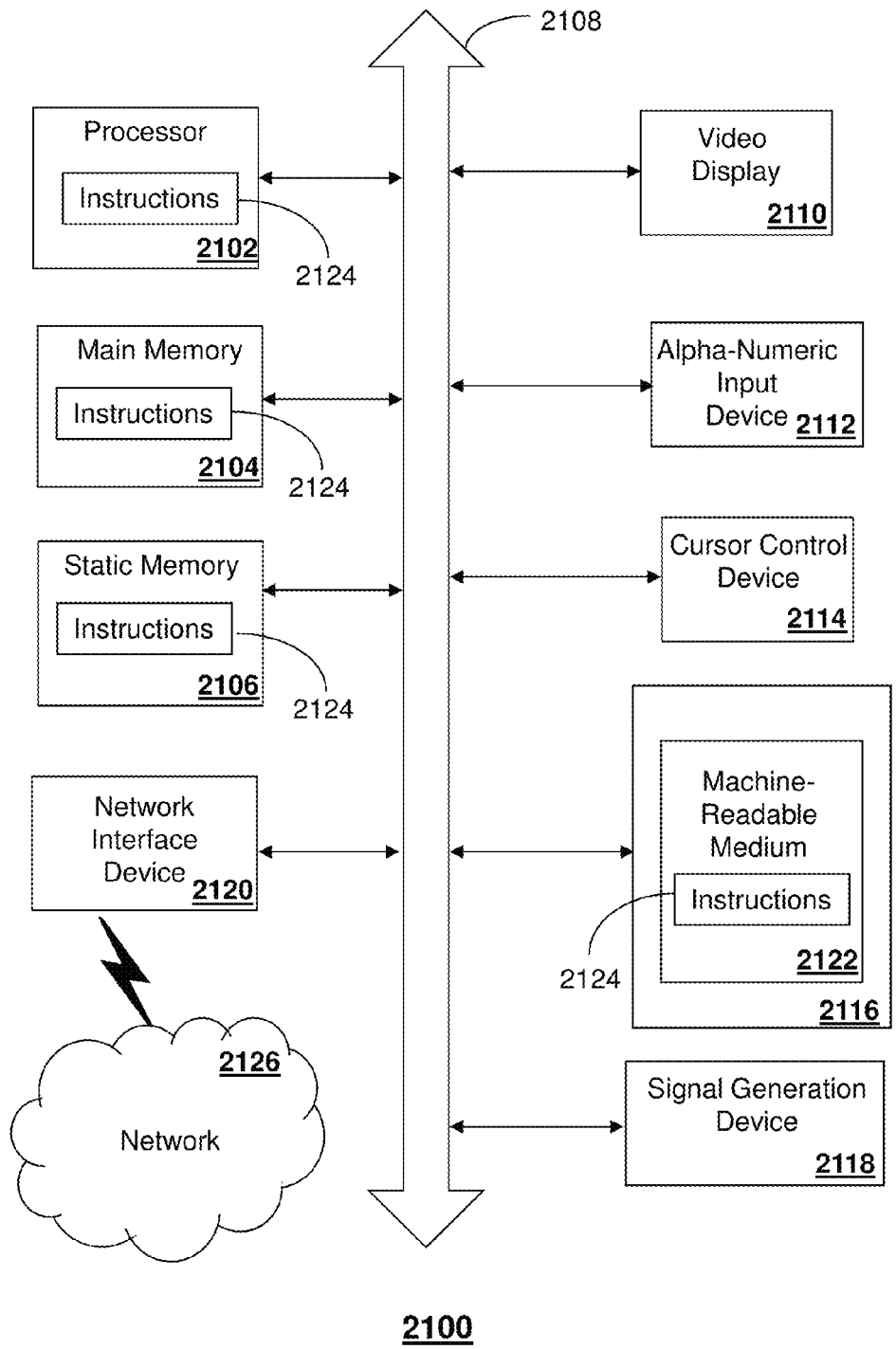
FIG. 21 depicts an illustrative diagrammatic representation of a machine in the form of a computer system within which a set of instructions, when executed, may cause the machine to perform any one or more of the methodologies disclosed herein.

FIG. 21 depicts an exemplary diagrammatic representation of a machine in the form of a computer system 2100 within which a set of instructions, when executed, may cause the machine to perform any one or more of the methods discussed above. One or more instances of the machine can operate, for example, as the communication device 100 of FIG. 1 or the control circuit 302 associated with tunable reactive element 310 in FIG. 3 or the control circuit 502 associated with tunable reactive element 504 of FIG. 5. In some embodiments, the machine may be connected (e.g., using a network) to other machines. In a networked deployment, the machine may operate in the capacity of a server or a client user machine in server-client user network environment, or as a peer machine in a peer-to-peer (or distributed) network environment.

The machine may comprise a server computer, a client user computer, a personal computer (PC), a tablet PC, a smart phone, a laptop computer, a desktop computer, a control system, a network router, switch or bridge, or any machine capable of executing a set of instructions (sequential or otherwise) that specify actions to be taken by that machine. It will be understood that a communication device of the subject disclosure includes broadly any electronic device that provides voice, video or data communication. Further, while a single machine is illustrated, the term "machine" shall also be taken to include any collection of machines that individually or jointly execute a set (or multiple sets) of instructions to perform any one or more of the methods discussed herein.

The computer system 2100 may include a processor (or controller) 2102 (e.g., a central processing unit (CPU), a graphics processing unit (GPU, or both), a main memory 2104 and a static memory 2106, which communicate with each other via a bus 2108. The computer system 2100 may further include a video display unit 2110 (e.g., a liquid crystal display (LCD), a flat panel, or a solid state display. The computer system 2100 may include an input device 2112 (e.g., a keyboard), a cursor control device 2114 (e.g., a mouse), a disk drive unit 2116, a signal generation device 2118 (e.g., a speaker or remote control) and a network interface device 2120.

The disk drive unit 2116 may include a tangible computer-readable storage medium 2122 on which is stored one or more sets of instructions (e.g., software 2124) embodying any one or more of the methods or functions described herein, including those methods illustrated above. The instructions 2124 may also reside, completely or at least partially, within the main memory 2104, the static memory 2106, and/or within the processor 2102 during execution thereof by the computer system 2100. The main memory 2104 and the processor 2102 also may constitute tangible computer-readable storage media.

Dedicated hardware implementations including, but not limited to, application specific integrated circuits, programmable logic arrays and other hardware devices can likewise be constructed to implement the methods described herein. Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

In accordance with various embodiments of the subject disclosure, the methods described herein are intended for operation as software programs running on a computer processor. Furthermore, software implementations can include, but not limited to, distributed processing or component/object distributed processing, parallel processing, or virtual machine processing can also be constructed to implement the methods described herein.

While the tangible computer-readable storage medium 622 is shown in an example embodiment to be a single medium, the term "tangible computer-readable storage medium" should be taken to include a single medium or multiple media (e.g., a centralized or distributed database, and/or associated caches and servers) that store the one or more sets of instructions. The term "tangible computer-readable storage medium" shall also be taken to include any non-transitory medium that is capable of storing or encoding a set of instructions for execution by the machine and that cause the machine to perform any one or more of the methods of the subject disclosure.

The term "tangible computer-readable storage medium" shall accordingly be taken to include, but not be limited to: solid-state memories such as a memory card or other package that houses one or more read-only (non-volatile) memories, random access memories, or other re-writable (volatile) memories, a magneto-optical or optical medium such as a disk or tape, or other tangible media which can be used to store information. Accordingly, the disclosure is considered to include any one or more of a tangible computer-readable storage medium, as listed herein and including art-recognized equivalents and successor media, in which the software implementations herein are stored.

Although the present specification describes components and functions implemented in the embodiments with reference to particular standards and protocols, the disclosure is not limited to such standards and protocols. Each of the standards for Internet and other packet switched network transmission (e.g., TCP/IP, UDP/IP, HTML, HTTP) represent examples of the state of the art. Such standards are from time-to-time superseded by faster or more efficient equivalents having essentially the same functions. Wireless standards for device detection (e.g., RFID), short-range communications (e.g., Bluetooth, WiFi, Zigbee), and long-range communications (e.g., WiMAX, GSM, CDMA, LTE) are contemplated for use by computer system 2100.

The illustrations of embodiments described herein are intended to provide a general understanding of the structure of various embodiments, and they are not intended to serve as a complete description of all the elements and features of apparatus and systems that might make use of the structures described herein. Many other embodiments will be apparent to those of skill in the art upon reviewing the above description. Other embodiments may be utilized and derived therefrom, such that structural and logical substitutions and changes may be made without departing from the scope of this disclosure. Figures are also merely representational and may not be drawn to scale. Certain proportions thereof may be exaggerated, while others may be minimized. Accordingly, the specification and drawings are to be regarded in an illustrative rather than a restrictive sense.

Although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, are contemplated by the subject disclosure.

The Abstract of the Disclosure is provided with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A mobile communication device, comprising:
   a plurality of antennas including radiating elements;
   phase shifters connected with the radiating elements;
   a matching network including an adjustable reactive element, wherein the plurality of antennas is coupled with the matching network;
   a memory storing computer instructions; and
   a processor coupled to the memory and the phase shifters, wherein the processor, responsive to executing the computer instructions, performs operations comprising:
      obtaining Received Signal Strength Indicator (RSSI) data;
      performing beam forming based on the RSSI data utilizing the phase shifters;
      determining whether a first throughput threshold can be satisfied;
      adjusting the beam forming utilizing the phase shifters responsive to a determination that the first throughput threshold cannot be satisfied, wherein the adjusting of the beam forming is based on forming a desired antenna pattern that increases radiated throughput and reduces antenna coupling among the plurality of antennas;
      responsive to the adjusting of the beam forming, determining radiated throughput for an uplink throughput;
      responsive to a first determination that the radiated throughput satisfies a second throughput threshold, reducing transit power; and
      responsive to a second determination that the radiated throughput does not satisfy the second throughput threshold, tuning the matching network.

2. The mobile communication device of claim 1, wherein the phase shifters comprise voltage tunable dielectric capacitors.

3. The mobile communication device of claim 1, wherein the phase shifters comprise at least one of a semiconductor varactor, a micro-electro-mechanical systems (MEMS) varactor, a semiconductor switched capacitor, or a MEMS switched capacitor.

4. The mobile communication device of claim 1, wherein each of the radiating elements is connected with one of the phase shifters.

5. The mobile communication device of claim 1, wherein the processor, responsive to executing the computer instructions, performs operations comprising:
   calculating and storing throughput values during the performing of the beam forming; and
   utilizing at least a portion of the stored throughput values for the determining of whether the throughput threshold can be satisfied.

6. The mobile communication device of claim 1, comprising a matching network including an adjustable reactive element, wherein the plurality of antennas is coupled with the matching network, and wherein the processor, responsive to executing the computer instructions, performs operations comprising:
   tuning the matching network towards a pre-determined match.

7. The mobile communication device of claim 1, comprising a matching network including an adjustable reactive element, wherein the plurality of antennas is coupled with the matching network, and wherein the processor, responsive to executing the computer instructions, performs operations comprising:
   tuning the matching network based on a tuning value from a look-up table of the memory that corresponds to a use case for the mobile communication device, wherein the tuning value is empirical data based on at least one of a total radiated power or a total isotropic sensitivity.

8. The mobile communication device of claim 7, wherein the use case corresponds to at least one of a flip open state, a slider out state, a hand's free operation state, hand-held operation state, ear-piece speaker operation state, or a speaker-phone operation state.

9. The mobile communication device of claim 1, wherein the adjusting of the beam forming is based on instructions received from a base station.

10. The mobile communication device of claim 9, wherein the adjustable reactive element comprises at least one of a voltage tunable dielectric capacitor, a semiconductor varactor, a micro-electro-mechanical systems (MEMS) varactor, a semiconductor switched capacitor, or a MEMS switched capacitor.

11. A non-transitory computer-readable storage device comprising executable instructions which, responsive to being executed by a processor of a communication device, cause the processor to perform operations comprising:
   obtaining Received Signal Strength Indicator (RSSI) data;
   performing beam forming based on the RSSI data utilizing phase shifters connected with radiating elements of a plurality of antennas;
   determining whether a first throughput threshold can be satisfied;
   adjusting the beam forming utilizing the phase shifters responsive to a determination that the first throughput threshold cannot be satisfied, wherein the adjusting of the beam forming is based on forming a desired antenna pattern that increases radiated throughput and reduces antenna coupling among the plurality of antennas;
   responsive to the adjusting of the beam forming, determining radiated throughput for an uplink throughput;
   responsive to a first determination that the radiated throughput satisfies a second throughput threshold, reducing transit power; and
   responsive to a second determination that the radiated throughput does not satisfy the second throughput threshold, tuning a matching network of the communication device.

12. The non-transitory computer-readable storage device of claim 11, wherein the operations further comprise
   calculating and storing throughput values during the performing of the beam forming;
   utilizing at least a portion of the stored throughput values for the determining of whether the first throughput threshold can be satisfied, wherein the adjusting of the beam forming is further based on instructions received from a base station.

* * * * *